United States Patent
Spang et al.

(10) Patent No.: US 9,839,927 B2
(45) Date of Patent: Dec. 12, 2017

(54) NOZZLE ASSEMBLY AND METHOD FOR FLUID DISPENSING

(71) Applicant: S. C. Johnson & Son, Inc., Racine, WI (US)

(72) Inventors: Ronald H. Spang, Kenosha, WI (US); Matthew T. Mcdonnell, Bristol, WI (US); David Leifheit, Racine, WI (US); Cory J. Nelson, Racine, WI (US); Matthew Thurin, Wauwatosa, WI (US); Philip Anthony, III, Chicago, IL (US); Aaron Eiger, Chicago, IL (US); Evan Thompson, Chicago, IL (US); Douglas A. Soller, Racine, WI (US)

(73) Assignee: S. C. Johnson & Son, Inc., Racine, WI (US)

( * ) Notice: Subject to any disclaimer, the term of this patent is extended or adjusted under 35 U.S.C. 154(b) by 27 days.

(21) Appl. No.: 14/772,881

(22) PCT Filed: Mar. 6, 2014

(86) PCT No.: PCT/US2014/021262
§ 371 (c)(1),
(2) Date: Sep. 4, 2015

(87) PCT Pub. No.: WO2014/138421
PCT Pub. Date: Sep. 12, 2014

(65) Prior Publication Data
US 2016/0016188 A1    Jan. 21, 2016

Related U.S. Application Data

(60) Provisional application No. 61/864,167, filed on Aug. 9, 2013, provisional application No. 61/775,101, filed on Mar. 8, 2013.

(51) Int. Cl.
*B67B 1/00* (2006.01)
*B05B 11/00* (2006.01)
(Continued)

(52) U.S. Cl.
CPC ............ *B05B 11/3011* (2013.01); *B05B 1/12* (2013.01); *B05B 1/1645* (2013.01);
(Continued)

(58) Field of Classification Search
CPC . B05B 11/3011; B05B 1/1645; B05B 1/1654; B05B 1/1681; B05B 1/16
(Continued)

(56) References Cited

U.S. PATENT DOCUMENTS 3,685,739 A    8/1972  Vanier
4,925,106 A *  5/1990  Maas ................... B05B 1/12
                                              239/333

(Continued)

FOREIGN PATENT DOCUMENTS

DE    1926796 A1    3/1970
WO    94/11114 A1   5/1994

OTHER PUBLICATIONS

International Search Report—PCT/US2014/021262—dated Jun. 27, 2014.

*Primary Examiner* — Jeremy W Carroll
(74) *Attorney, Agent, or Firm* — Banner & Witcoff, Ltd.

(57) ABSTRACT

A fluid delivery system for dispensing fluid can include a dispenser, such as a trigger engine-type dispenser (100), configured to draw fluid up from a container. A nozzle assembly can include a nozzle (160), and a nozzle slide (112). The nozzle slide can be configured to slide and/or rotate relative to the shroud (102) to provide different dispensing modes. In alternative examples, the nozzle (160) can be configured to rotate in 30 degree increments relative (Continued)

to the shroud (102) to provide the different dispensing modes or the nozzle assembly can include a nozzle extension, and the nozzle extension can be configured to rotate relative to the shroud to provide different dispensing patterns out of the nozzle. In another example a first nozzle can be configured to provide one or more dispensing modes, and a second nozzle can be configured to provide a different dispensing mode than the first nozzle. Methods of dispensing fluids and methods of assembling fluid dispensers are also disclosed.

19 Claims, 16 Drawing Sheets

(51) Int. Cl.
| | |
|---|---|
| B05B 1/12 | (2006.01) |
| B05B 1/16 | (2006.01) |
| B05B 1/30 | (2006.01) |
| B05B 15/06 | (2006.01) |
| B65D 23/08 | (2006.01) |
| B29C 63/42 | (2006.01) |
| B05B 1/34 | (2006.01) |

(52) U.S. Cl.
CPC ........ *B05B 1/3026* (2013.01); *B05B 11/0029* (2013.01); *B05B 11/0094* (2013.01); *B05B 11/3023* (2013.01); *B05B 11/3059* (2013.01); *B05B 15/068* (2013.01); *B05B 1/3452* (2013.01); *B05B 1/3468* (2013.01); *B05B 11/3045* (2013.01); *B29C 63/423* (2013.01); *B65D 23/0878* (2013.01)

(58) Field of Classification Search
USPC .... 222/153.06, 257, 266, 252, 321.8, 383.1, 222/330, 385, 331
See application file for complete search history.

(56) References Cited

U.S. PATENT DOCUMENTS

| | | | |
|---|---|---|---|
| 4,991,778 A | | 2/1991 | Maas et al. |
| 5,397,060 A | | 3/1995 | Maas et al. |
| 5,752,626 A | * | 5/1998 | Bachand ............... B05B 1/3436 222/136 |
| 6,050,505 A | | 4/2000 | Ou |
| 6,234,412 B1 | * | 5/2001 | von Schuckmann . B05B 1/3436 222/321.8 |
| 2009/0256008 A1 | * | 10/2009 | Foster .................... B05B 7/005 239/539 |
| 2011/0108447 A1 | | 5/2011 | Hoefing et al. |
| 2011/0315717 A1 | | 12/2011 | Lewandowski et al. |
| 2016/0038959 A1 | * | 2/2016 | Lopez ................ B05B 11/3011 222/135 |

* cited by examiner

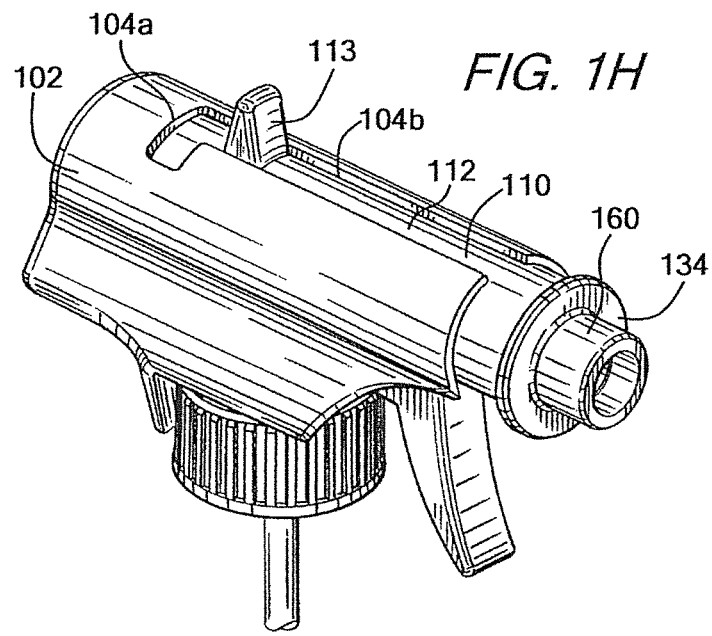
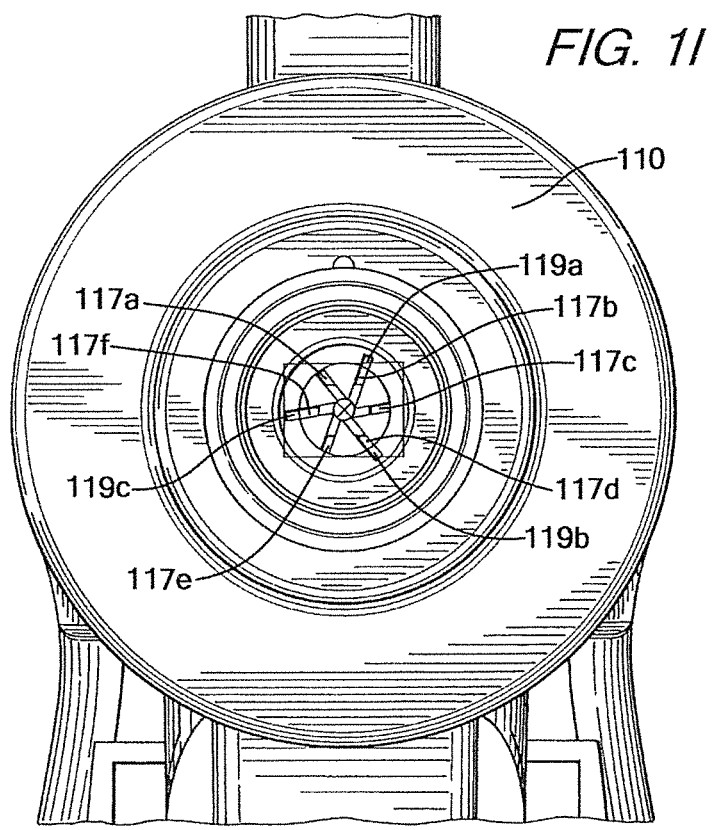

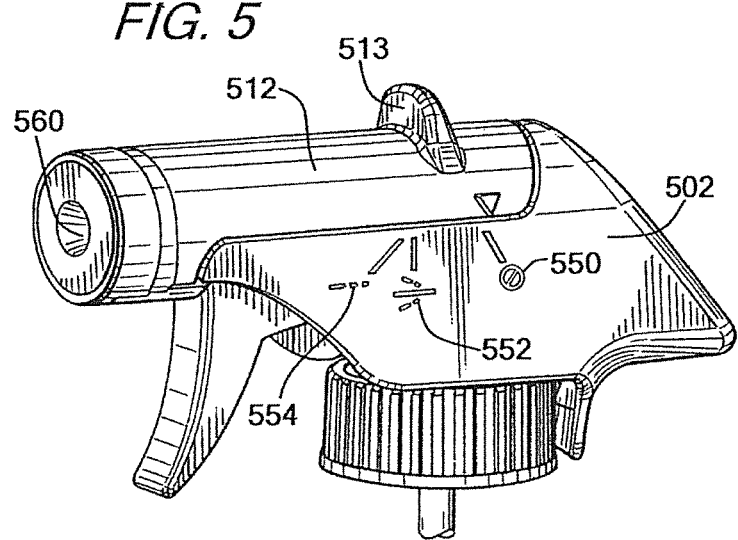
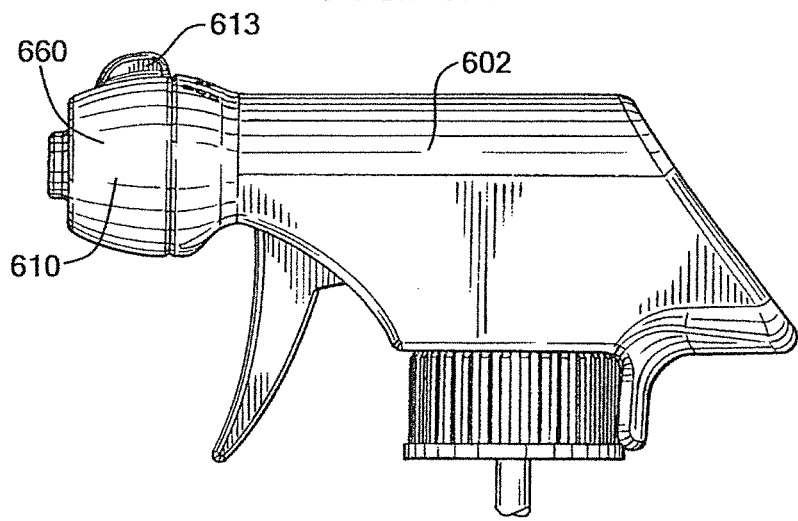

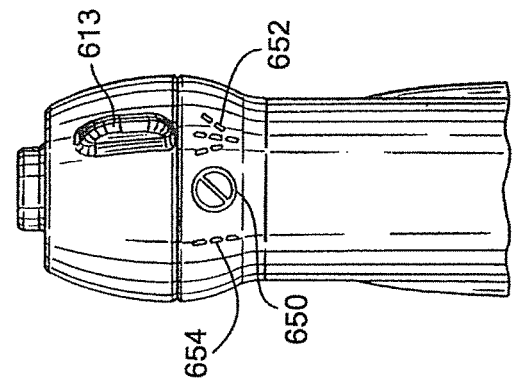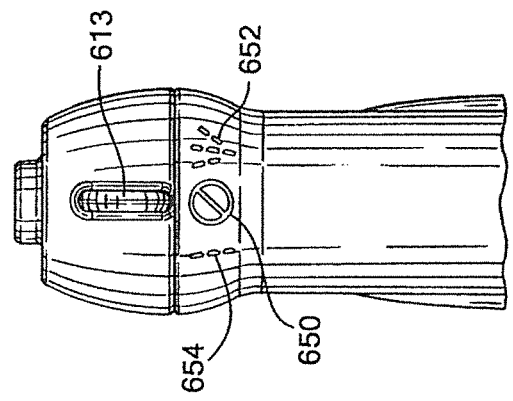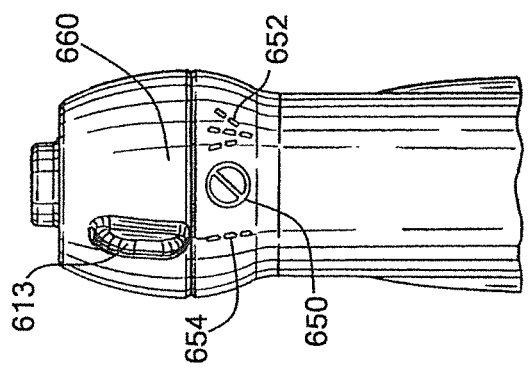

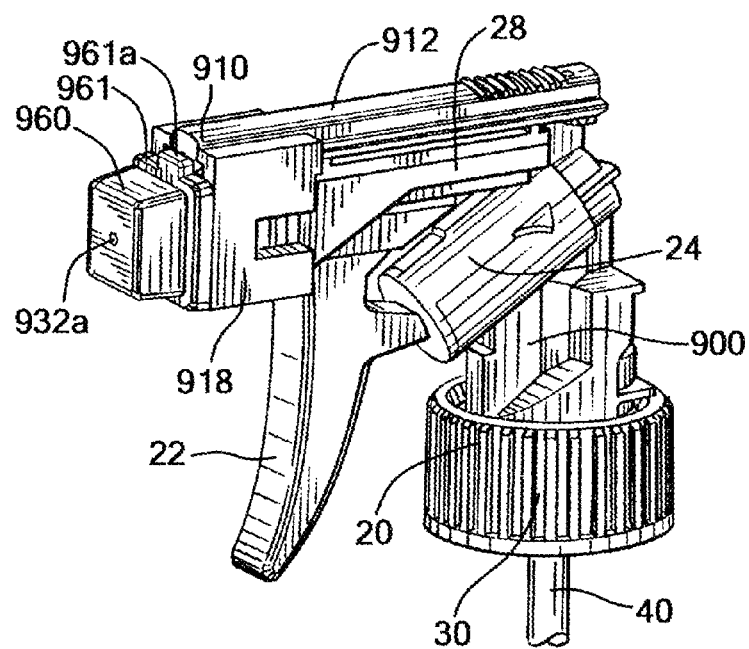
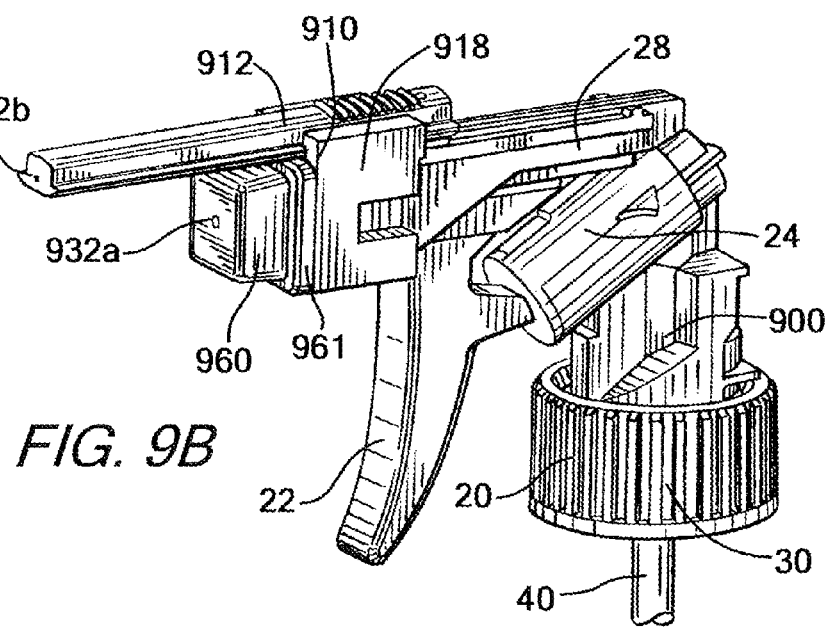

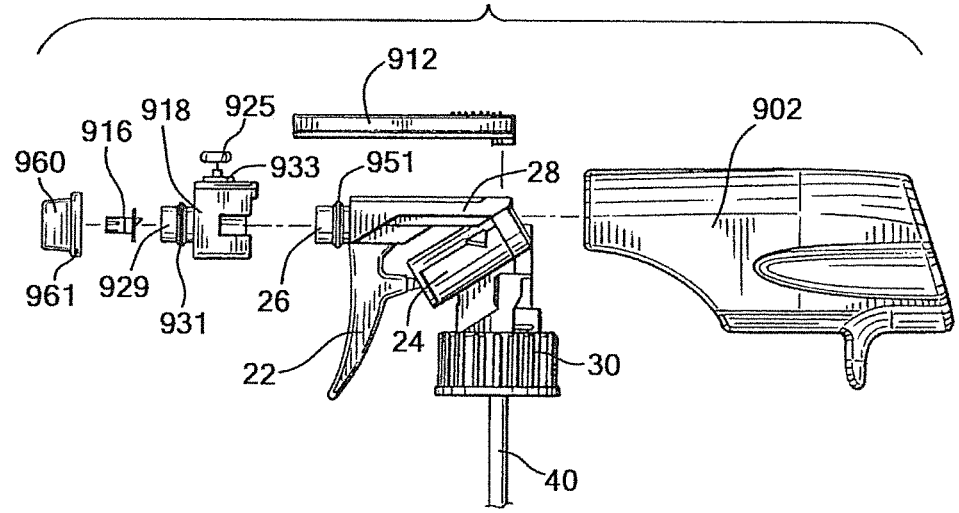
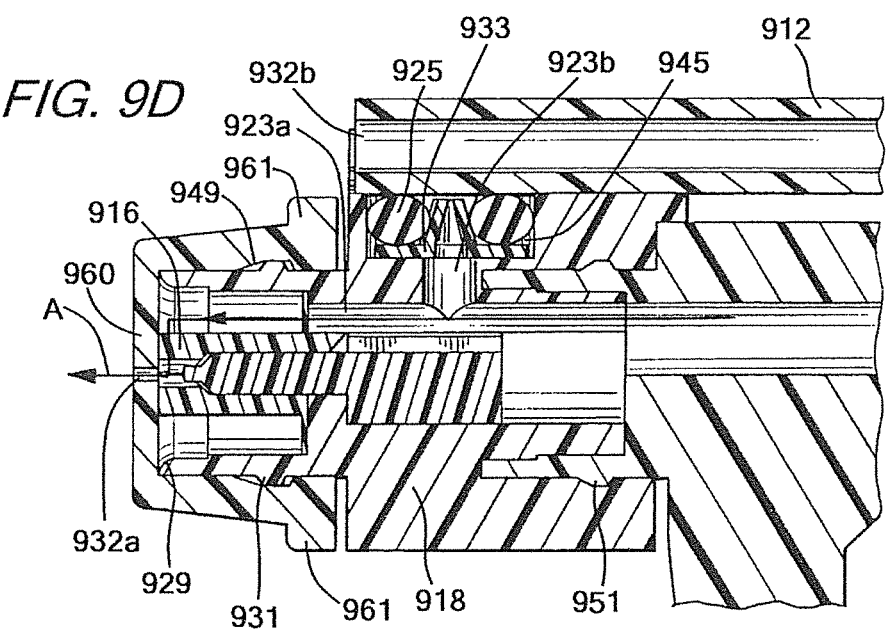

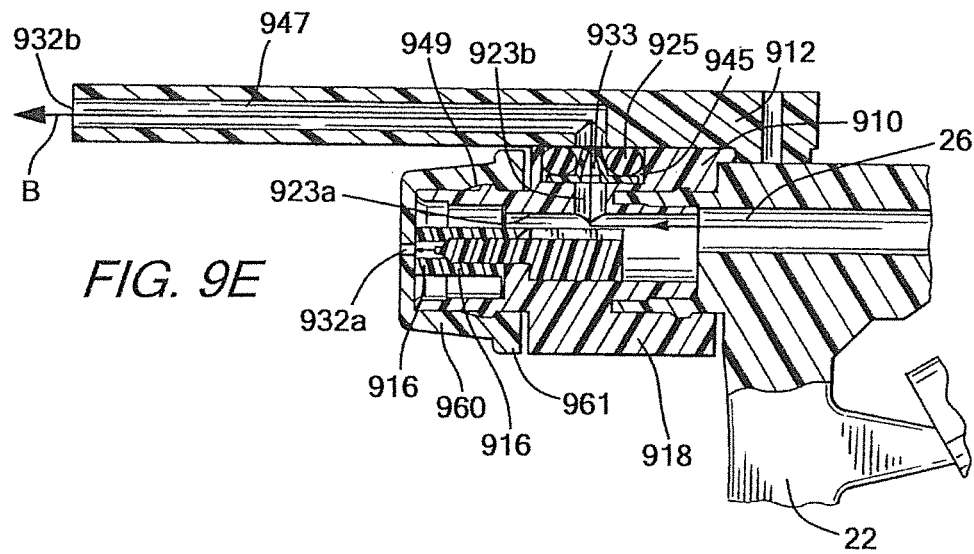
FIG. 9E
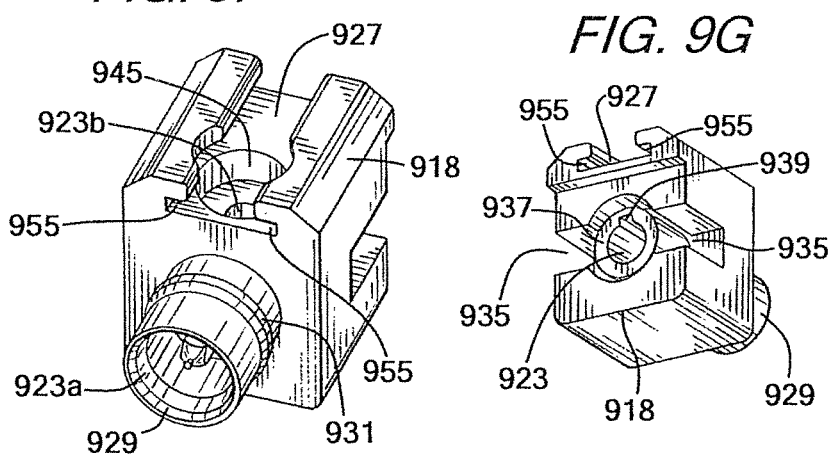
FIG. 9F
FIG. 9G
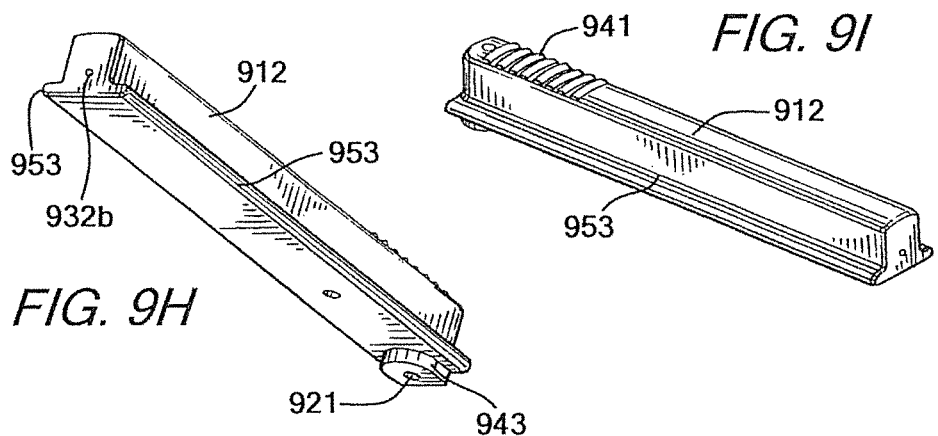
FIG. 9H
FIG. 9I

NOZZLE ASSEMBLY AND METHOD FOR FLUID DISPENSING

CROSS REFERENCE TO RELATED APPLICATIONS

This application claims priority to U.S. Application No. 61/864,167 filed Aug. 9, 2013 and U.S. Application No. 61/775,101 filed Mar. 8, 2013, both of which are incorporated herein by reference in their entirety.

FIELD

The present disclosure relates generally to fluid dispensing assemblies and, more particularly, to nozzle assemblies capable of producing different fluid dispensing modes.

BACKGROUND

Fluid dispensers can take on various general forms, e.g., trigger sprayers, finger type pumps, aerosol dispensers, etc. Nozzle assemblies can be coupled to such fluid sprayers to project different fluid dispensing patterns, e.g., stream, spray (divergent or conical), aerated foam, and the like during dispensing. The different dispensing patterns can be selected by the user and included as indicia on the fluid dispensers as modes, such as: "OFF", "SPRAY," "STREAM," etc.

The design of such fluid dispensers generally depends on the intended application and/or the characteristics of the fluid that is dispensed. For example, if the fluid is intended to be suspended in the air or is intended to provide increased coverage on a surface, a nozzle assembly to project a divergent spray may be used, but if the fluid is intended to be applied to a localized region on a surface, e.g., carpet, wood, a painted surface, etc., a nozzle assembly to project a stream may be used. Product can be dispensed from a bottle by means of a fluid dispenser, such as a trigger engine.

SUMMARY

This Summary provides an introduction to some general concepts relating to this invention in a simplified form that are further described below in the Detailed Description. This Summary is not intended to identify key features or essential features of the invention.

Aspects of the disclosure herein relate to assemblies for providing multi-spray modes with a dispenser such as a trigger engine.

Aspects of the disclosure herein relate to different nozzle types including a sliding nozzle, a rotary nozzle, and a flip nozzle.

In certain examples, a fluid delivery system for dispensing fluid, including liquids, foams, gels, etc., can include a dispenser, such as a trigger engine-type dispenser, configured to draw fluid up from a container. A shroud can be configured to mount to the dispenser, and a nozzle assembly can include a nozzle, and a nozzle slide can be provided on the delivery system. The nozzle slide can be configured to slide relative to the shroud to provide different dispensing modes.

In other examples, the nozzle can be configured to rotate in 30 degree increments relative to the shroud to provide the different dispensing modes.

In other examples, a nozzle assembly can include a nozzle and a nozzle extension, and the nozzle extension can be configured to rotate relative to the shroud to provide different spray patterns out of the nozzle.

In other examples, a first nozzle can be configured to provide one or more dispensing modes, and a second nozzle can be configured to provide a different dispensing mode than the first nozzle.

Additional aspects of the disclosure include methods of dispensing fluids and methods of assembling fluid dispensers.

BRIEF DESCRIPTION OF THE DRAWINGS

The foregoing Summary, as well as the following Detailed Description, will be better understood when considered in conjunction with the accompanying drawings in which like reference numerals refer to the same or similar elements in all of the various views in which that reference number appears.

FIG. 1H shows a perspective view of the dispenser of FIG. 1A in a third mode;

FIG. 1I shows a front view of the dispenser of FIG. 1A in the third mode;

FIG. 5 depicts a front perspective view of another example dispenser in a first position in accordance with another aspect of the disclosure;

FIG. 6A depicts a side perspective view of another example dispenser in a first position in accordance with another aspect of the disclosure;

FIG. 6B depicts a top view of a portion of the dispenser of FIG. 6A in a first position;

FIG. 6C depicts a top view of a portion of the dispenser of FIG. 6A in a second position;

FIG. 6D depicts a top view of a portion of the dispenser of FIG. 6A in a third position;

FIG. 9A depicts a partial front perspective view of another example fluid dispenser in a first position in accordance with another aspect of the disclosure;

FIG. 9B shows a partial front perspective view of the example dispenser of FIG. 9A in a second position;

FIG. 9C shows an exploded perspective view of the example dispenser of FIG. 9A;

FIG. 9D shows a partial cross-sectional view of the example dispenser of FIG. 9A in the first position;

FIG. 9E shows a partial cross-sectional view of the example dispenser of FIG. 9A in the second position;

FIG. 9F shows a front perspective view of an example adapter that can be used in conjunction with the example dispenser of FIG. 9A;

FIG. 9G shows a rear perspective view of the example adapter of FIG. 9F;

FIG. 9H illustrates a bottom perspective view of an exemplary sliding nozzle that can be used in conjunction with the example dispenser of FIG. 9A;

FIG. 9I illustrates a top perspective view of the exemplary sliding nozzle of FIG. 9H.

DETAILED DESCRIPTION

I. Detailed Description of Example Fluid Dispensers and Methods of Operation and Assembly of Example Fluid Dispensers In the following description of various examples of nozzle assemblies and components of the this disclosure, reference is made to the accompanying drawings, which form a part hereof, and in which are shown by way of illustration various example structures and environments in which aspects of the invention may be practiced. It is to be understood that other structures and environments may be utilized and that structural and functional modifications may be made from the specifically described structures and methods without departing from the scope of the present invention.

Also, while the terms "front," "back," "rear," "side," "forward," "rearward," "backward," "top," and "bottom" and the like may be used in this specification to describe various example features and elements of the invention, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of the invention.

The fluid dispensers disclosed herein are adapted for use with any composition, such as an air freshener, deodorizer, cleaning agent, and any combination of the like, that has intended uses when dispensed as a divergent spray and/or a stream. Such compositions can have a variety of forms including, but not limited to, liquids, foams, gels, etc.

Figure 1A:
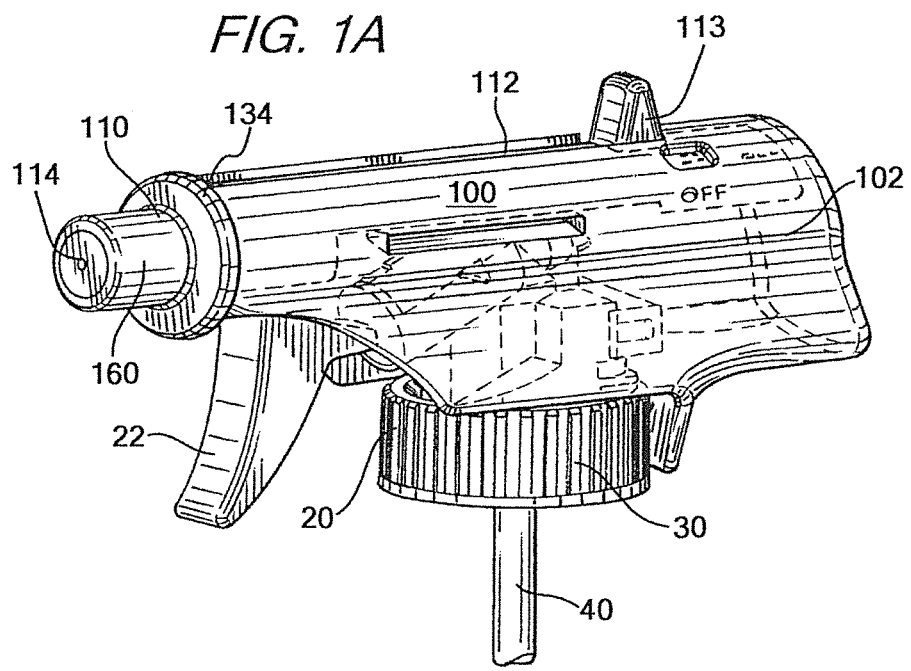
FIG. 1A shows an isometric assembled view of an example dispenser.
Figure 1B:
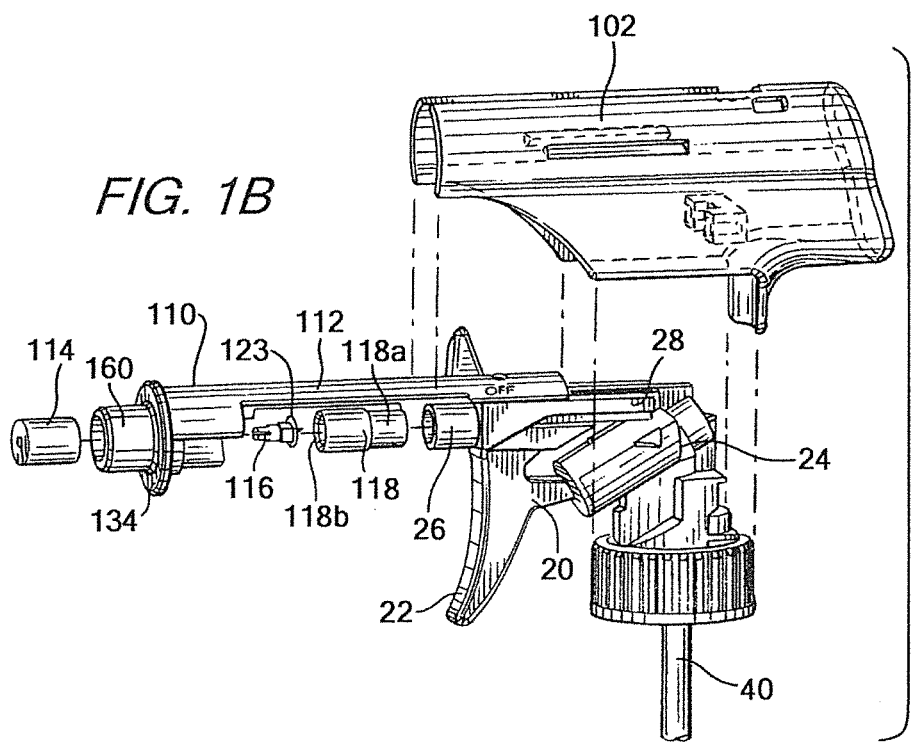
FIG. 1B shows an isometric exploded view of the dispenser of FIG. 1A.

FIGS. 1A-1J depict an example fluid dispenser with a nozzle assembly 110 having a sliding nozzle 112 configured to dispense product from a container. FIG. 1A shows an isometric assembled view of the example fluid dispenser and the relationship of the various components of the example nozzle assembly 110. FIG. 1B shows an isometric, exploded view of the fluid dispenser of FIG. 1A.

Figure 1C:
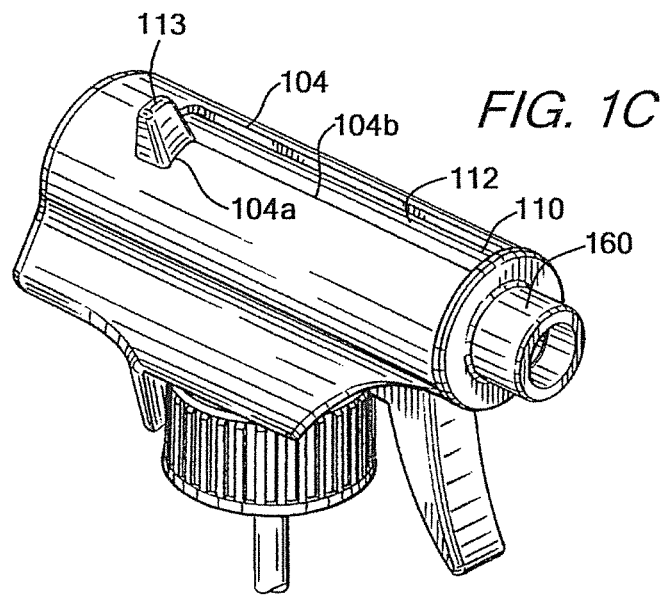
FIG. 1C shows an isometric view of the dispenser of FIG. 1A in a first mode.
Figure 1D:
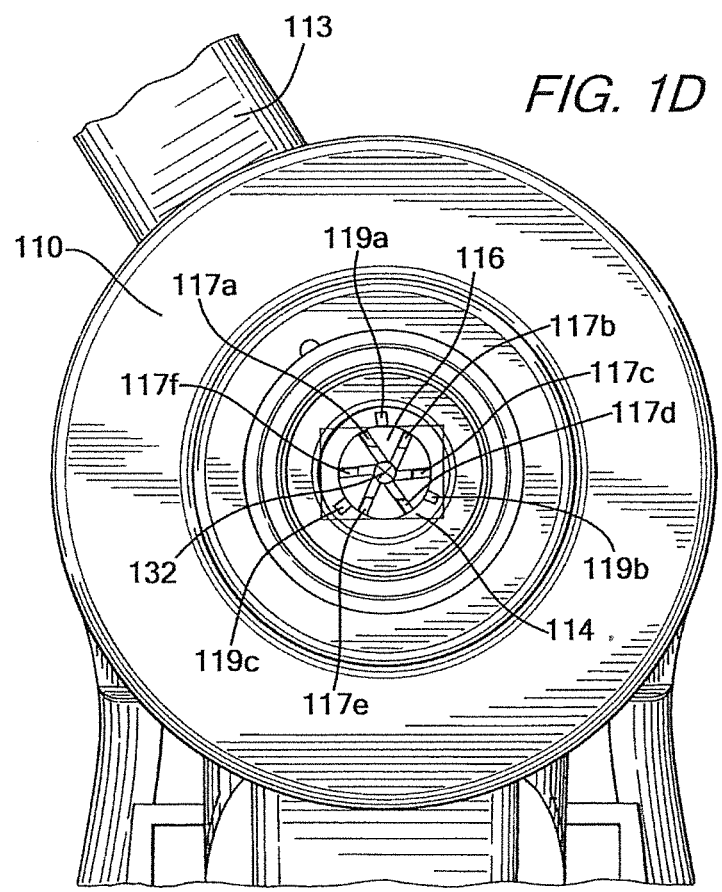
FIG. 1D shows a front view of the dispenser of FIG. 1A in the first mode.

FIG. 1C shows the fluid dispenser nozzle assembly 110 with the nozzle slide 112 in the closed position or the "OFF" mode. FIG. 1D shows a front view of the nozzle assembly 110 in the user selected "OFF" mode and depicts the misalignment of spray channels.

Figure 1E:
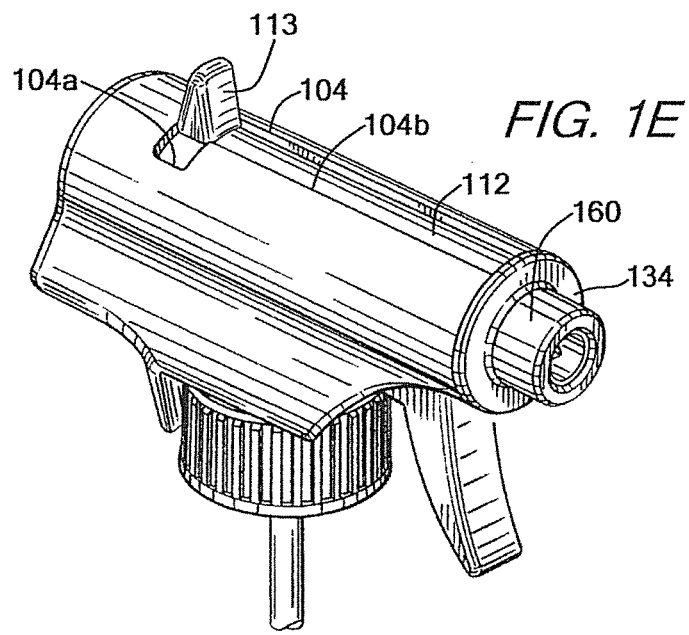
FIG. 1E shows an isometric view of the dispenser of FIG. 1A in a second mode.
Figure 1F:
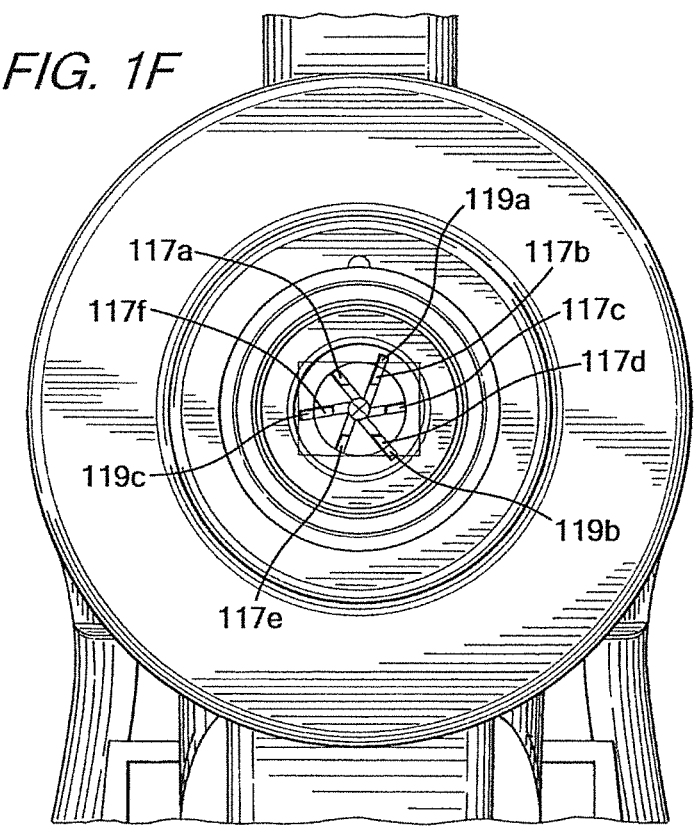
FIG. 1F shows a front view of the dispenser of FIG. 1A in the second mode.
Figure 1G:
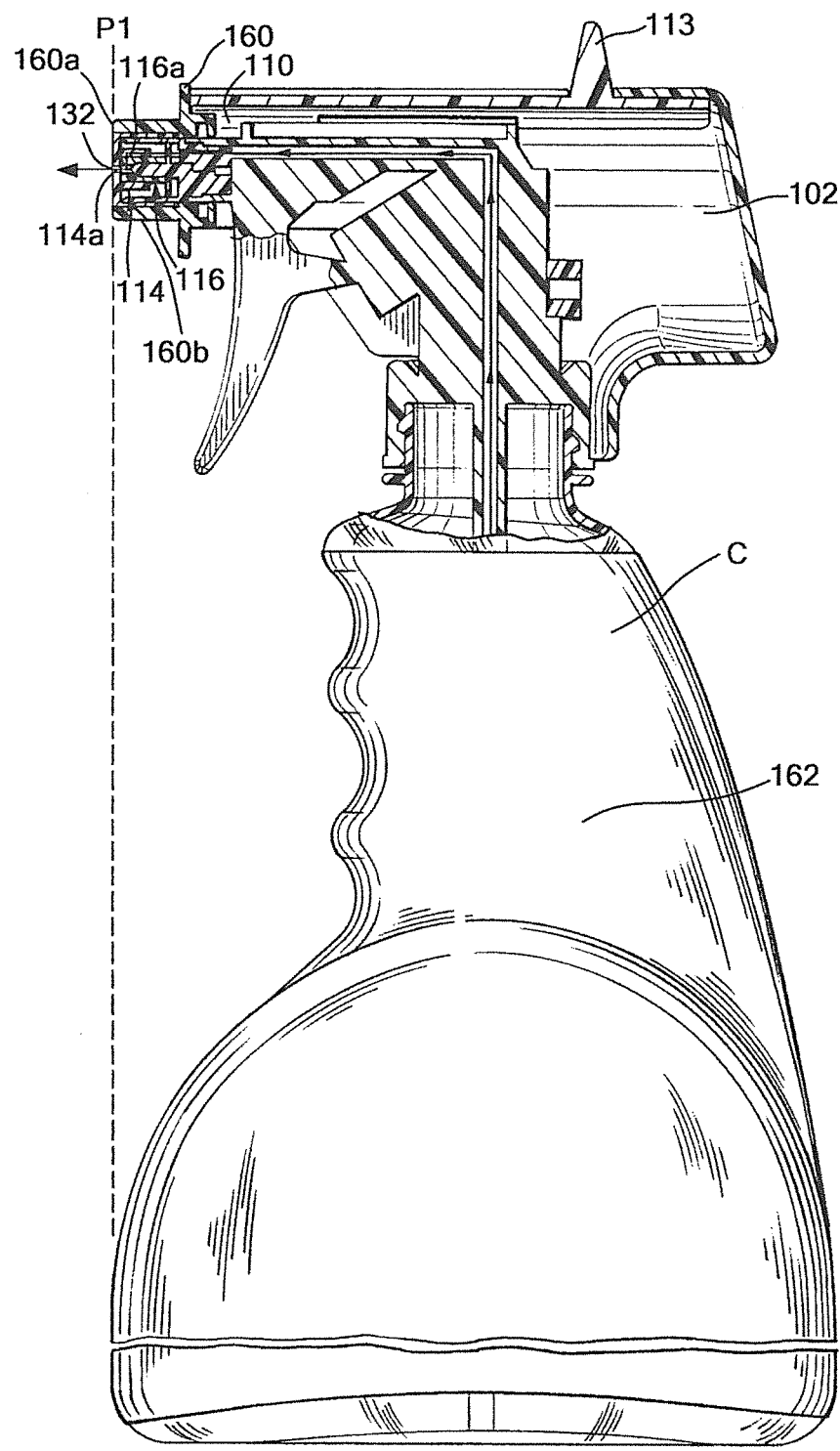
FIG. 1G depicts a cross-sectional view of the dispenser of FIG. 1A attached to a container and in the second mode.

FIG. 1E shows the sliding nozzle assembly in the user selected "SPRAY" mode. FIG. 1F shows a front view of the nozzle assembly in the user selected "SPRAY" or "STREAM" mode and demonstrates the alignment of spray channels 119a-c, 117b, 117d, and 117f. FIG. 1G depicts a cross-sectional view of the fluid dispenser and nozzle assembly 110 in the "SPRAY MODE" and illustrates the fluid flow path of the fluid being dispensed through the fluid dispenser.

Figure 1J:
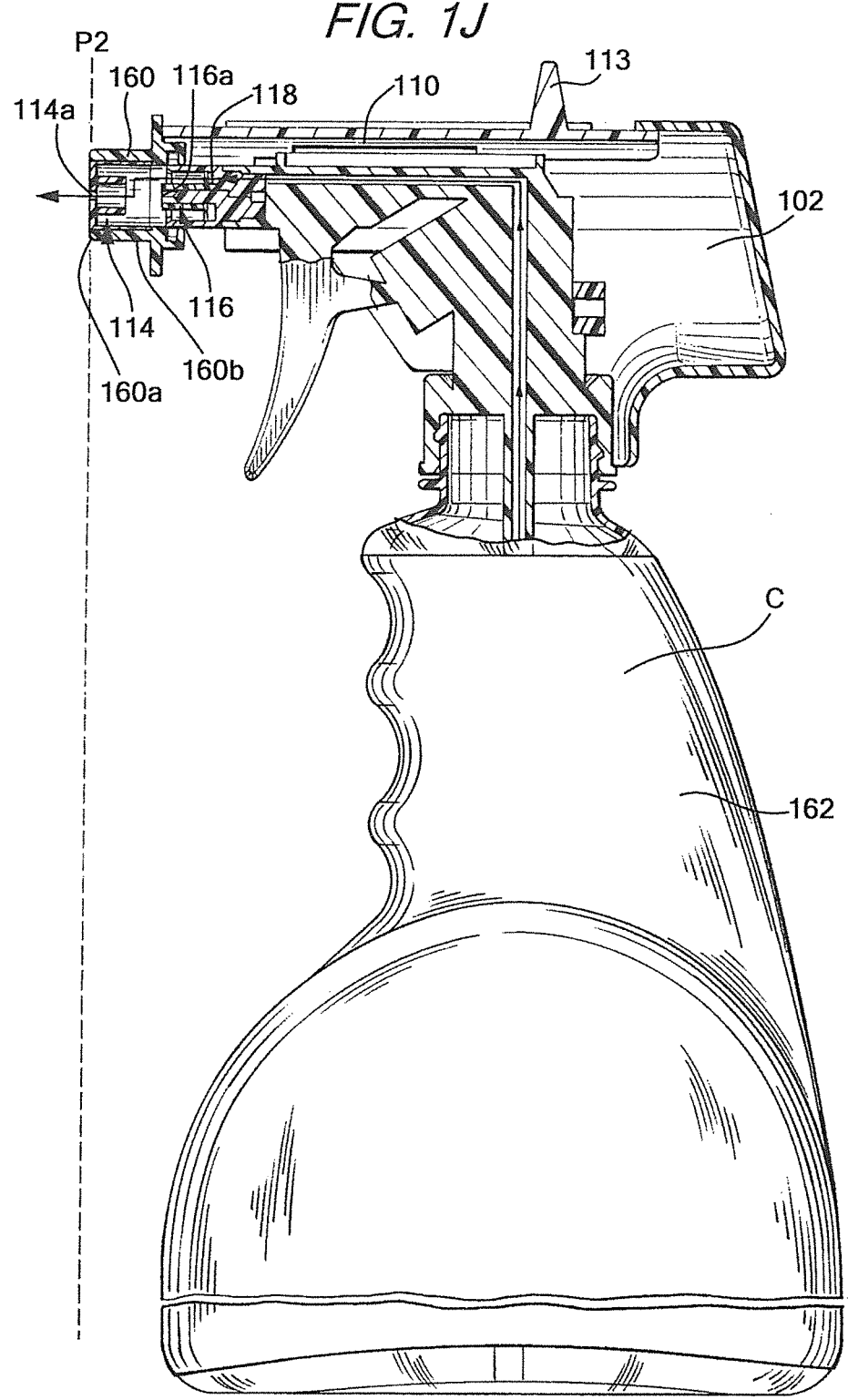
FIG. 1J depicts a cross-sectional view of the dispenser of FIG. 1A attached to a container and in the third mode.

FIG. 1H shows a perspective view of the fluid dispenser and nozzle assembly 110 in the user selected "STREAM" mode. FIG. 1I shows a front view of the nozzle assembly 110 in the user selected "SPRAY" or "STREAM" mode and demonstrates the alignment of spray channels 119a-c, 117b, 117d, and 117f. FIG. 1J depicts a cross-sectional view of the fluid dispenser and nozzle assembly 110 in the "SPRAY MODE" and illustrates the fluid flow path of the fluid being dispensed through the nozzle assembly 110.

As shown in FIG. 1A, the fluid dispenser 100 can include a nozzle assembly 110, a trigger engine 20, a shroud 102, which acts as a housing for the fluid dispenser 100, and an internally threaded cylindrical portion 30 for securing or coupling the fluid dispenser to a container or bottle (not shown). The housing of the fluid dispenser includes an inlet portion and an outlet portion for fluid.

As shown in FIGS. 1A and 1B, the trigger engine 20 can include trigger lever 22, a pumping mechanism formed of a cylinder 24 that receives a piston and spring assembly (not shown), a dispensing tube 26, an internal check valve (not shown), and an internal passageway 28. The trigger engine 20 can also include a cylindrical dip tube 40 which extends into an opening of the container or bottle and into the fluid for drawing the fluid up from the container and into the trigger engine and into the nozzle assembly 110.

When the user actuates the trigger lever 22, fluid is drawn up from through the dip tube 40 past the check valve and into the cylinder 24. Cylinder 24 is in fluid contact with the internal passageway 28. As the user continues to actuate the trigger lever 22, fluid is dispensed from the internal passageway 28 into the dispensing tube 26. The dispensing tube 26 can be connected to a nozzle assembly and fluid is then dispensed through the nozzle assembly 110 as discussed herein. The trigger engine 20 can be used in conjunction with any of the nozzle assemblies and configurations described herein.

As shown in FIG. 1B, the nozzle assembly 110 can include a nozzle 160, a nozzle slide 112, a nozzle insert 114, a slit valve 116, and an intermediate pipe 118. The nozzle slide 112 can include the nozzle 160, which is defined by a portion that extends forward from an outer rim 134. The nozzle slide 112 can include a handle 113 for sliding the integrally connected nozzle 160 relative to the shroud 102.

The nozzle slide 112 is configured to slide in a linear manner relative to the shroud 102 to provide different dispensing patterns out of the nozzle 160. The nozzle slide 112 is also configured to rotate relative to the shroud to provide the closed or off position. The nozzle slide 112 can be fixed to the nozzle 160 such that when the nozzle slide 112 slides or rotates relative to the shroud 102, the nozzle 160 also slides or rotates relative to the slit valve 116. The outer rim 134 of the nozzle slide 112 can be configured to limit the movement of the slide valve 112 in the rear direction within a slot 104 located in the shroud 102. Likewise, a locking tab or locking mechanism (not shown) can be included on the nozzle slide 112 for preventing the nozzle slide 112 from moving too far forward in the slot 104 or from coming out of the slot 104 on the shroud 102.

The intermediate pipe 118 can be placed into fluid contact with the dispensing tube 26 of the trigger engine 20. In this example, a smaller diameter portion 118a on the intermediate pipe 118 can be provided to fit within and provide a seal between the intermediate pipe 118 and the dispensing tube 26 of the trigger engine 20. The intermediate pipe 118 acts as a conduit for the fluid advanced from the dispensing tube 26 from the trigger engine 20.

The intermediate pipe 118 can also provide an inner seal surface for when the nozzle slide 112 is slid forward in the shroud 102. In particular, the slit valve 116 can be located in an increased diameter portion 118b of the intermediate pipe 118 or a front portion of the intermediate pipe 118. Alternatively, the slit valve 116 can be formed as part of the intermediate pipe 118. The slit valve 116 can stay in a fixed relation to the intermediate pipe 118 and can form a seal within the intermediate pipe 118. In particular the slit valve 116 includes a radially extending flange 123, which seals against an interior chamber formed by the intermediate pipe 118 in the increased diameter portion 118b. Additionally, the decreased diameter portion 118a limits the movement of the slit valve when the flange 123 abuts against the decreased diameter portion 118a. The slit valve 116 provides a one-way valve for fluid flow, as well as, provides multiple slit valve spray channels 117a-f. In this example, as shown in FIGS. 1D and 1F the slit valve 116 can be provided with six slit valve spray channels 117a-f.

The nozzle insert 114 can be pressed into or molded into the nozzle 160 of the nozzle slide 112. The nozzle slide 112 and the nozzle insert 114 can be arranged in a fixed relationship with each other and can rotate and slide together as an integral assembly. As shown in FIGS. 1D and 1F, the nozzle insert 114 contains nozzle insert spray channels 119a-c that can be configured to be in alignment or non-alignment with the slit valve spray channels 117b, 117d, 117f to provide the off, spray, and stream dispensing modes. Also, the nozzle insert 114 is provided with an exit orifice 132 for dispensing the fluid from the trigger engine 20. As will be described in further detail below, the nozzle slide 112 together with the nozzle insert 114 are configured to slide (forward and back) and to rotate relative to the intermediate pipe 118 to provide the user selected dispensing modes.

The shroud or housing 102 can be mounted onto the trigger engine 20. The shroud 102 provides an interface with the user's hand, communication with the nozzle assembly 110 for dispensing mode selection, a mechanical path for the nozzle slide 112, and holds the assembly into place. As shown in FIG. 1C, the shroud 102 also includes an elongated slot 104 for receiving and guiding the handle 113 of the nozzle slide 112 and generally provides for sliding movement of the nozzle slide 112 along the length of the shroud 102.

The slot 104 can include a first portion 104a which extends radially along the shroud 102 and a second portion 104b that extends axially along the shroud 102. As shown, for example, in FIG. 1C, the slot 104 can extend axially to the end of the shroud 102 to provide a visual effect to the consumer to give the appearance that the nozzle 160 can extend from the shroud 102. This may entice the consumer to purchase the product.

The first portion 104a can include a predetermined length to provide the handle 113 and nozzle slide 112 with 30 degrees of rotation relative to the shroud 102. The slot 104 is sized to receive the handle 113 of the nozzle slide 112 therein and the slot 104 width generally corresponds to width of the handle 113 of the nozzle slide 112.

The slot 104 can be located generally on the top of the shroud 102 along a center line of the shroud 102. However, other positions and locations of the slot are contemplated. The first portion 104a of the slot 104 can be located on either side of the shroud 102 depending on how the fluid dispenser is placed on the shelf and displayed to the consumer. Typically, fluid dispensers are placed on the shelf with the left side facing outward, so it may be desired to place the first portion 104a on the left side of the shroud 102. A locking tab or mechanism can be included next to the slot 104 on the shroud for preventing the nozzle slide 112 from moving too far in the slot or from coming out of the slot on the shroud 102. Again the nozzle slide 112 is also limited by the outer rim 134 of the nozzle slide 112.

FIGS. 1C and 1D show the fluid dispenser 100 in the off mode. The nozzle slide 112 is configured to rotate relative to the shroud 102 into the off position. As shown in FIG. 1C, the handle 113 is located in the first portion 104a of the elongated slot in a first or offset position in the shroud 102, which causes the nozzle insert spray channels 119a-c and the slit valve spray channels 117a-f to be misaligned. In particular, because of the fixed relationship of the nozzle slide 112 and the nozzle insert 114 when the nozzle slide 112 is rotated into the offset position as shown in FIG. 1C, the nozzle insert spray channels 119a-c are also moved offset from the slit valve spray channels 117a-f to cause misalignment of the spray channels 117a-f, 119a-c. In this way, no fluid is permitted to pass from the slit valve 116 the nozzle insert 114. FIG. 1D shows a front view of the nozzle assembly 110 in the user selected "OFF" mode and depicts the misalignment of the nozzle insert spray channels 119a-c and the slit valve spray channels 117a-f.

In the off mode as shown in FIG. 1D, the nozzle insert spray channels 119a-c and the slit valve spray channels 117a-f are offset 30 degrees rotationally relative to each other. Consequently, the slit valve spray channels 117a-f do not line up with the nozzle insert spray channels 119a-c, thus, preventing any fluid from being dispensed and providing an off mode or position.

To place the fluid dispenser into a first dispensing mode, shown as the spray mode from the off mode, the user rotates the nozzle slide 112 to the 0 degree position relative to the shroud 102 as shown in FIG. 1E. As shown in FIG. 1E, the handle 113 is located in the second portion 104b of the elongated slot 104 in a second position or a rearward most position in the second portion 104b of the elongated slot 104. This causes the nozzle insert spray channels 119a-c and the slit valve spray channels 117a-f to be aligned and creates fluid contact between the slit valve 116 and the nozzle insert 114. Because of the fixed relationship of the nozzle slide 112 and the nozzle insert 114, when the nozzle slide 112 is rotated into the second position as shown in FIG. 1E, the nozzle insert spray channels 119a-c are also moved into alignment with the slit valve spray channels 117a-f.

FIG. 1F shows a front view of the nozzle assembly 110 in the user selected spray mode and depicts the alignment of the nozzle insert spray channels 119a-c and the slit valve spray channels 117b, 117d, and 117f. Specifically in the spray mode or position as shown in FIG. 1F, nozzle insert spray channel 119a aligns with slit valve spray channel 117b, nozzle insert spray channel 119b aligns with slit, valve spray channel 117d, and nozzle insert spray channel 119c aligns with slit valve spray channel 117f; thus providing three separate channels for the fluid to be dispensed through the nozzle insert 114.

FIG. 1G shows a side cross-sectional view of the fluid dispenser in the spray mode. FIG. 1G depicts a fluid flow path through the fluid dispenser 100. As shown in FIG. 1G, the fluid is drawn up through the dip tube 40, through the trigger engine 20, through the slit valve 116, and out through the nozzle insert 114 and finally through the exit orifice 132. FIG. 1G also demonstrates the spacing between the slit valve 116 and the nozzle insert 114. When in the spray mode, the front face 116a of the slit valve 116 and an interior face 114a of the nozzle insert 114 are configured to have a minimal spacing to maintain the fluid swirl generated in the slit valve. In one example, a front face 116a of the slit valve 116 and an interior face 114a of the nozzle insert 114 have a spacing of approximately 0.015 in. to 0.025 in.

To place the fluid dispenser into, a second dispensing mode, shown as the stream mode from the spray mode, the user slides the nozzle slide 112 to a third position within the second portion 104b in the slot 104 as shown in FIG. 1H. As shown in FIG. 1H, the handle 113 is located in the second portion 104b of the elongated slot 104 in a third position slightly forward of the second position. As such, a user slides the handle 113, and thus the nozzle slide 112 in a forward direction to move between a first dispensing mode and a second dispensing mode. The outer rim 134 of the nozzle slide 112 is moved out of contact with and in a spaced relation from the shroud 102 such that a front portion including the nozzle 160 of the nozzle slide 112 extends outward in a forward direction from the shroud 102.

FIG. 1I shows a front view of the nozzle assembly 110 in the user selected stream mode and depicts the alignment of the nozzle insert spray channels 119a-c and the slit valve spray channels 117b, 117d, and 117f. As illustrated in FIG. 1I, in the third position, the slit valve 116 and the nozzle insert 114 do not change angular position with respect to one another and the nozzle insert spray channels 119a-c and the slit valve spray channels 117a-f remain aligned and fluid contact is maintained between the slit valve 116 and the nozzle insert 114. However, the spaced relationship between the nozzle insert 114 and the slit valve 116 creates a stream-like spray from the fluid dispenser 100.

FIG. 1J shows a side cross-sectional view of the fluid dispenser in the stream mode. FIG. 1J depicts a fluid flow path through the fluid dispenser 100. Similar to the second slide valve 112 position, as shown in FIG. 1J, the fluid is drawn up through the dip tube 40, through the trigger engine 20, through the slit valve 116, out through the nozzle insert 114, and finally through the exit orifice 132. FIG. 1J also demonstrates an increased spacing between the slit valve 116 and the nozzle insert 114 from the second slide valve 112 position (spray mode) to the third slide valve 112 position (stream mode).

When in the stream mode, the front face 116a of the slit valve 116 and an interior face 114a of the nozzle insert 114 are configured to have an increased spacing or offset from that of the spray mode. This offset is directly related to, and determined by, the linear travel of the nozzle slide 112 that the user moves to achieve the various dispensing modes.

In one example, in the stream mode, the front face 116a of the slit valve 116 and the interior face 114a of the nozzle insert 114 can have a larger spacing ranging from 0.125 in. to 2 in. In another example, the spacing between the front face 116a of the slit valve 116 and the interior face 114a of the nozzle insert 114 can range from 0.5 in. to 1 in. This additional spacing allows the fluid swirl generated in the slit valve 116 to re-converge and form a stream upon exiting the nozzle insert exit orifice 132. Also, as shown in FIG. 1J, during the stream mode, the nozzle 160 is located forward and away from the slit valve 116. Locating the nozzle 160 forward (i.e., offsetting the nozzle 160 from the slit valve 116) causes the swirl chamber that would otherwise be created by the slit valve to be eliminated and fluid is dispensed as a stream.

The nozzle slide 112 does not move linearly or axially along the shroud 102 between the first position (off mode) and the second position (spray mode). Rather the nozzle slide 112 only rotates relative to the shroud between the first position (off mode) and the second position (spray mode). The nozzle slide 112 can move linearly in a forward direction between (i) the second position (spray mode) in which the front tip of the nozzle slide 112 is approximately even with or behind a vertical plane P1 defined by the front wall of the spray bottle or container C; and (ii) the third position (stream mode) in which the front tip of the nozzle slide 112 is positioned beyond the plane defined by the front wall of the spray bottle or container C. In this way, the nozzle 160 can include a tip portion 160a and a slide portion 160b, and the slide portion 160b can be configured to move outward in a substantially linear manner relative the housing or shroud 102 for moving the tip portion 160b beyond the vertical plane defined by the front wall of the container.

Figure 2A:
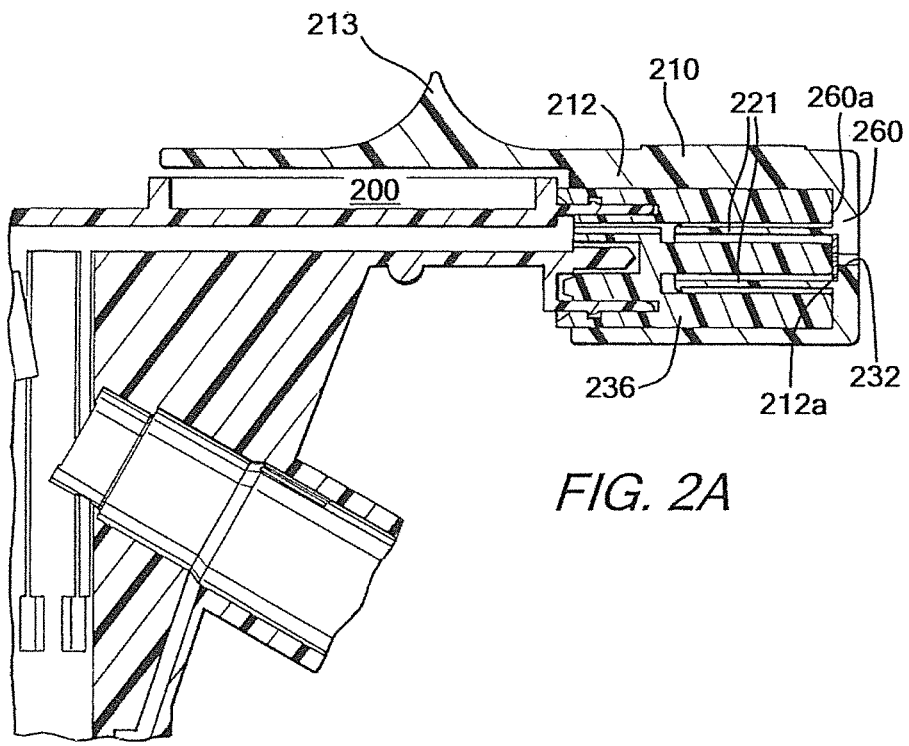
FIG. 2A depicts a cross-sectional view of another example dispenser in a first position in accordance with another aspect of the disclosure.
Figure 2B:
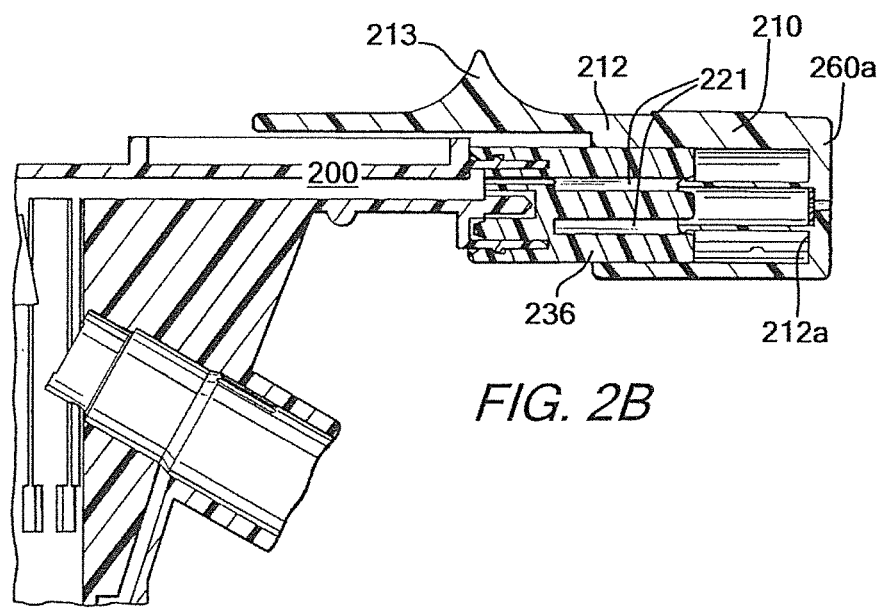
FIG. 2B depicts a cross-sectional view of the example dispenser of FIG. 2A in a second position.

FIGS. 2A and 2B illustrate another example of a fluid dispenser 200 with a nozzle slide 212 configured to dispense product from container. The example of FIGS. 2A and 2B is similar to the example of FIGS. 1A-J where like reference numerals represent like components. The nozzle assembly 210 can be placed onto a similar trigger engine 20 as the embodiment depicted in FIGS. 1A-1J. However, in the example depicted in FIGS. 2A and 2B, the nozzle slide 212 does not rotate in relation to the fluid dispenser, rather the nozzle slide 212 is only permitted to move axially or linearly in relation to the slit valve (not shown) to create two different spray patterns. In this example, the nozzle insert is omitted. Additionally, a nozzle adapter 236 can be provided instead of an intermediate pipe to provide a channel for the fluid from the trigger engine to the nozzle assembly.

In this example, the nozzle slide 212 can be configured to move into two separate positions to provide spray and stream modes. In particular, the nozzle slide 212 is configured to move to a first position in a rearward-most position to provide a spray pattern and a second position relative to the shroud to provide a stream pattern. In alternative examples, the nozzle 260 can be provided with an off mode when the nozzle slide 212 is in the rearward-most position on a shroud. In such an example, the nozzle 260 may combine the off mode with only one dispensing mode or with more than one dispensing mode.

As shown in FIG. 2A, the example nozzle assembly 210 generally includes a nozzle 260, a nozzle slide 212, a nozzle adapter 236, and a slit valve (not shown). The nozzle slide 212 can include a handle 213, which can be grasped by the user to adjust the nozzle slide 212 relative to the fluid dispenser 200. The nozzle adapter 236 can include multiple slit valve spray channels 221. The nozzle adapter 236 is configured to receive fluid from a trigger engine, which can be the same trigger engine type as described above, and directs the fluid into the slit valve. The nozzle adapter 236 also permits the attachment of the nozzle slide 212 to the trigger engine. The slit valve (not depicted) can be formed as part of the nozzle adapter 236.

FIG. 2A shows the nozzle slide 212 in the first position or retracted position. In the first position or the retracted position the nozzle 260 is located at a first distance away from the slit valve to provide the spray mode. FIG. 2B shows the nozzle slide in an extended position. As shown in FIG. 2B in the second position the nozzle 260 is located at a second distance away from the slit valve to provide the stream mode. The second distance is greater than the first distance to provide the stream mode.

To move the nozzle slide 212 to the retracted position, the user can grasp the handle 213 connected to the nozzle slide 212 and move the nozzle slide 212 to the rearward most position on the fluid dispenser. When in the retracted position, the fluid dispenser 200 will produce a spray pattern or a wider spray pattern. When in the spray mode, the inner face 260a of the nozzle 260 and an outer face of the slit valve are configured to have a minimal spacing to maintain the fluid swirl generated in the slit valve and to dispense a spray out of the nozzle exit orifice 232 of the nozzle 260.

To move the nozzle slide 212 to the extended position, the user can grasp the handle 213 connected to the nozzle slide 212 and move the nozzle slide 212 to the forward most position on the fluid dispenser. When the extended mode, the dispenser will produce a stream pattern. When in the stream mode, the inner face 260a of the nozzle 260 and an outer face of the slit valve are configured to have an increased spacing from that of the spray mode to produce a stream spray pattern. This additional spacing allows the fluid swirl generated in the slit valve to re-converge and form a stream upon exiting the nozzle exit orifice 232.

In the above nozzle slide examples described in relation to FIGS. 2A, and 2B, the nozzle slide 212 can move linearly in a forward direction between (i) a first position in which the front tip of the nozzle 260 is approximately even with or behind a plane defined by the front wall of the spray bottle; and (ii) a second position in which the front tip of the nozzle 260 is positioned beyond the plane defined by the front wall of the spray bottle. The first position may be achieved when the nozzle 260 is in the off position, and/or the first dispensing mode, such as spray mode, while the second position may be achieved when the nozzle is in the second dispensing mode (e.g., the stream mode).

Figure 3A:
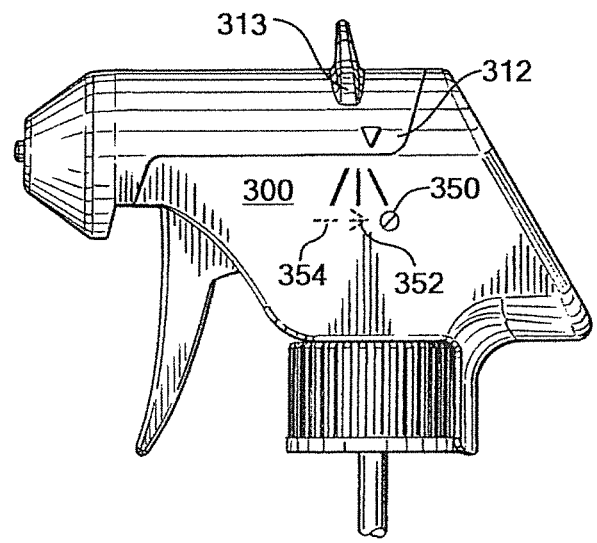
FIG. 3A depicts a side perspective view of another example dispenser in a first position in accordance with another aspect of the disclosure.
Figure 3B:
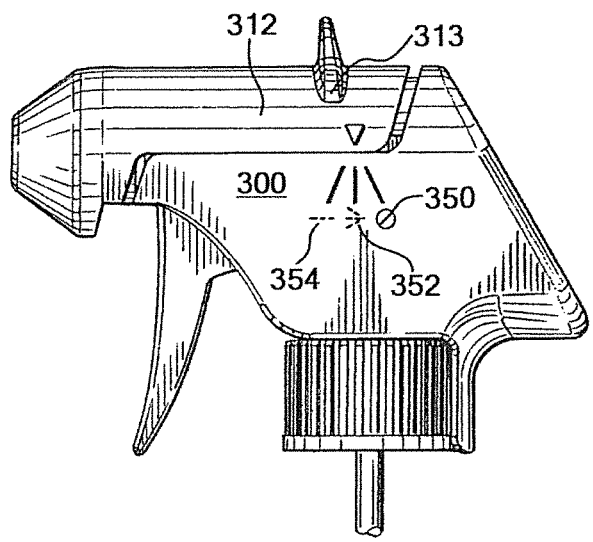
FIG. 3B depicts a side perspective view of the example dispenser of FIG. 3A in a second position.

FIGS. 3A and 3B depict another example shroud and nozzle assembly. This example is similar to the examples of FIGS. 1A-J, 2A-2B and can include the same internal working components with the same functionality as the example described in relation to FIGS. 2A-2B. Additionally, like reference numerals represent like components and the example nozzle assembly can be placed onto a similar trigger engine as the example shown and described in relation to FIGS. 1A-1J.

In this example, the shroud 302 can include icons to indicate dispensing mode, and the nozzle slide can include a refined geometry to provide a more aesthetically desirable fluid dispenser 300. The icons can include off 350, spray 352, and stream 354 modes. The nozzle slide 312 can include an outwardly extending tab 313, which can be grasped by the user to toggle the nozzle slide 312 to the different modes. The nozzle slide 312 can be moved to a first, second, and third position to produce different dispensing modes.

FIG. 3A depicts the fluid dispenser 300 in the first position or an off position where the internal components can be positioned in closed relation to each other as described above. FIG. 3B depicts the fluid dispenser in a second position or a spray position where the internal components can be positioned in an open relation to each other as described above to produce a spray pattern. The fluid dispenser 300 can also have a third position or a stream mode in which the internal components can be positioned in an open relation to each other as described above to produce a stream pattern.

Figure 4A:
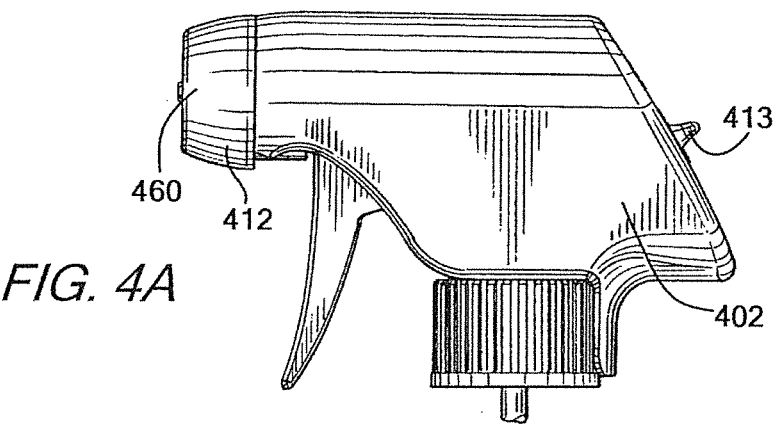
FIG. 4A depicts a side perspective view of another example dispenser in accordance with another aspect of the disclosure.
Figure 4B:
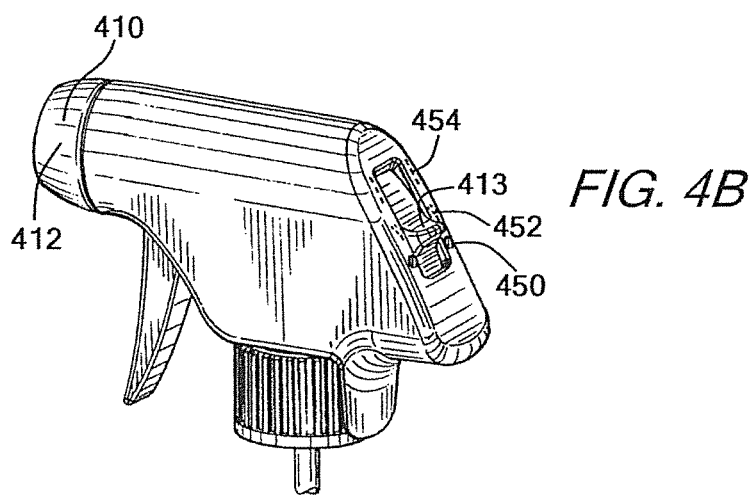
FIG. 4B depicts a rear perspective view of the example dispenser of FIG. 4A in a first position.
Figure 4C:
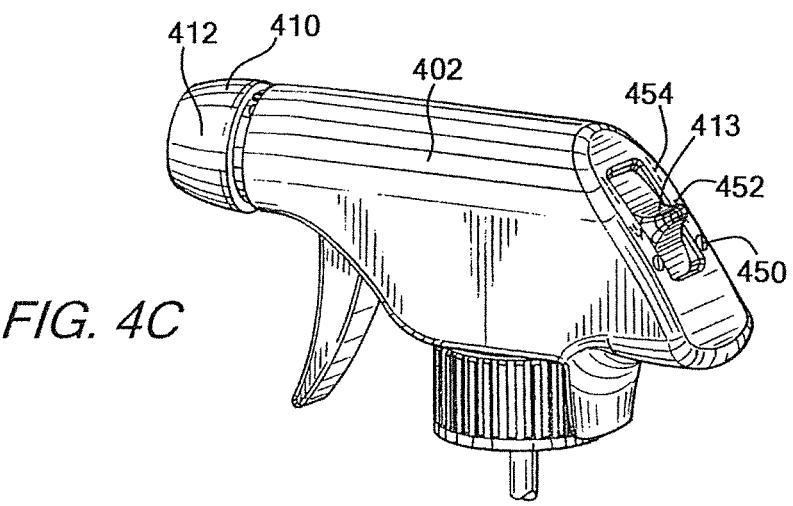
FIG. 4C depicts a rear perspective view of the example dispenser of FIG. 4A in a second position.

FIGS. 4A-4C depict another nozzle assembly example where a nozzle slide 412 can be configured to be moved linearly by the user. This example is also similar to the examples of FIGS. 1A-J, 2A-2B and can include the same internal working components with the same functionality as the example described in relation to FIGS. 2A-2B. Like reference numerals represent like components and the example nozzle slide assembly can be placed onto a similar trigger engine as the example shown and described above in relation to FIGS. 1A-1J.

In this example, the rear portion of the shroud 402 can include icons to indicate the dispensing mode to the user. The icons can include off 450, spray 452, and stream 454 modes. Like in the examples shown in described in relation to FIGS. 3A-3B, the linear sliding of the nozzle slide 412 of the nozzle assembly 410 produces a stream mode 454 when the nozzle slide 412 is fully extended, a spray mode 452 in the middle position, and an off mode 450 when the nozzle 460 is fully retracted in the shroud 402. In this example, the handle 413 can be located in a rearward location on the shroud 402. Because of the rearward location of the handle 413, the user is able to switch between dispensing modes with a single handed operation, by flipping their thumb.

FIG. 5 depicts another nozzle slide assembly example where a nozzle slide 512 can be configured to be moved linearly by the user. This example is also similar to the examples of FIGS. 1A-J, 2A-2B and can include the same internal working components with the same functionality as the example described in relation to FIGS. 1A-J, 2A-2B. Like reference numerals represent like components, and the example nozzle assembly 510 can be placed onto a similar trigger engine 20 as the example shown and described above in relation to FIGS. 1A-1J.

In this example, the nozzle slide 512 can be configured to convert the linear motion of the movement of the nozzle slide 512 to a rotary motion of the nozzle 560 to switch between dispensing modes. The middle portion of the shroud 502 can include icons to indicate the dispensing mode to the user. The icons can include off 550, spray 552, and stream 554 modes. The nozzle slide 512 can be adjusted linearly by grasping the handle 513 to move the nozzle slide 512 in relation to the fluid dispenser.

In the above nozzle slide examples, when the nozzle slides are selectively adjusted between the first dispensing mode (e.g., the spray mode) and the second dispensing mode (e.g., the stream mode), the nozzle is extended in an outward direction relative to the trigger housing or shroud. The extension of the nozzle may allow a user to better reach into tight crevasses (e.g., corners).

In the above nozzle slide examples, it may be desired to limit the front tip of the nozzle from extending past the plane defined by the front wall of the spray bottle during manufacturing and/or packaging. For example, as shown in FIG. 1G, the front of the nozzle 160 can define a plane P1, which does not extend past a plane defined by a front wall of a spray bottle (not shown). The arrangement allows for a shrink sleeve 162 to be applied to the bottle after the trigger is installed, and the shrink sleeve 162 can be applied from the top. Therefore, it may be desirable to limit the front tip 160a of the nozzle 160 from extending past the plane defined by the front wall of the spray bottle. In addition, in certain scenarios the finished bottles may be dropped into boxes for shipment and this may require that the bottle (as opposed to the trigger) to define the outermost periphery of the final product. However, during use the nozzle can extend past the plane defined by the front wall of the spray bottle. For example, as shown in FIG. 1J, the front of the nozzle 160 defines a vertical second plane P2, which can extend past the front wall of a spray bottle.

FIGS. 6A-6D depict another example shroud 602 and nozzle assembly 610 where the nozzle 660 rotates to provide the desired spray pattern. This example is also similar to the examples of FIGS. 1A-J, 2A-2B and can include the same internal working components with the same functionality as the example described in relation to FIGS. 1A-J, 2A-2B. However, the example of FIGS. 6A-6D does not include a nozzle slide. Rather the nozzle 660 only rotates relative to the shroud 602 to provide the desired dispensing modes. Like reference numerals represent like components and the example shroud 602 and nozzle assembly 610 can be placed onto a similar trigger engine as shown and described above in relation to FIGS. 1A-1J.

As shown in FIGS. 6A-6D, an outwardly extending tab 613 located on the nozzle 660 provides a grasping portion for the user to select the desired dispensing mode. To switch between dispensing modes requires 30 degrees of total rotational movement to make it easier for the user to select between modes than for example a 90 degree rotational movement. The 30 degree movement is achieved using the same slit valve configuration shown and described in relation to the examples above, and the nozzle 660 can be stopped at intermediate positions relative to the slit valve to achieve the desired dispensing modes. Additionally, other rotational increments are contemplated to achieve the desired dispensing modes, including rotational increments less than 90 degrees.

As shown in FIGS. 6B-6C, indicia are formed (e.g., molded) onto the shroud 602 and can be configured to align with the tab 613 to select the desired dispensing mode of the nozzle 660 to identify the various modes for the user. It is also contemplated that the indicia could be placed on other locations of the shroud and dispenser such as the trigger engine. The icons can include off 650, spray 652, and stream 654 modes. FIG. 6B shows the fluid dispenser in the stream mode. FIG. 6C shows the fluid dispenser in the off mode. FIG. 6D shows the fluid dispenser in the spray mode.

Figure 7:
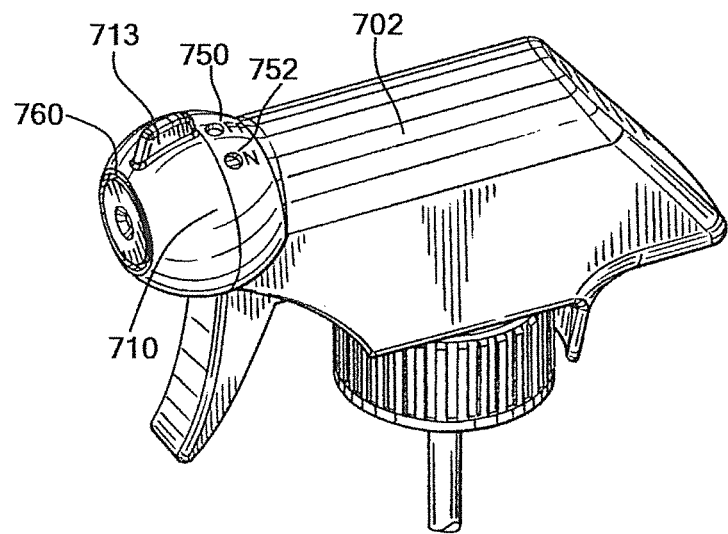
FIG. 7 depicts a front perspective view of another example dispenser in accordance with another aspect of the disclosure.

FIG. 7 depicts another example shroud 702 and nozzle assembly 710 that also has a rotating nozzle 760 that rotates to provide the desired spray pattern. The example depicted in FIG. 7 is similar to the example shown and described in relation to FIGS. 6A-6D, however, this example includes a refined shroud 702 and nozzle 760 geometry which takes into consideration the molding and assembly of the parts. This example is also similar to and can include the same internal working components with the same functionality as the example described in relation to FIGS. 1A-J, 2A-2B. However, the example of FIG. 7 also does not include a nozzle slide. Like reference numerals represent like components and the example shroud 702 and nozzle assembly 710 can be used with a similar trigger engine as the example shown and described above in relation to FIGS. 1A-1J.

In the example shown in FIG. 7, to switch between dispensing modes requires 30 degrees of total rotational movement to make it easier for the user to select between modes. However, other rotational increments are contemplated. The 30 degree movement is achieved using the same slit valve shown and described in relation to the examples above. The nozzle 760 can be stopped at intermediate positions relative to the internal slit valve to achieve the desired dispensing modes.

As shown in FIG. 7, an outwardly extending tab 713 located on the nozzle 760 provides a grasping portion to select the desired dispensing mode. Indicia can be formed (e.g., molded) onto the shroud 702 and can be configured to align with the tab 713 to select the desired dispensing mode of the nozzle 760 the nozzle 760 and/or the trigger housing/ shroud to identify the various modes for the user. The icons can include "OFF" 750, "ON" 752, and other dispensing modes. FIG. 7 shows the nozzle 760 in an off mode.

Figure 8A:
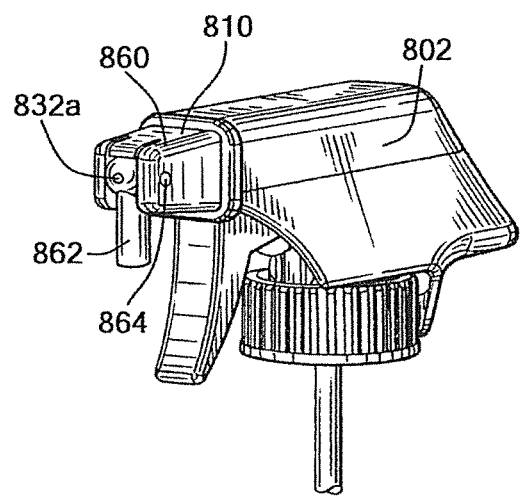
FIG. 8A depicts a front perspective view of another example dispenser in a first position in accordance with another aspect of the disclosure.
Figure 8B:
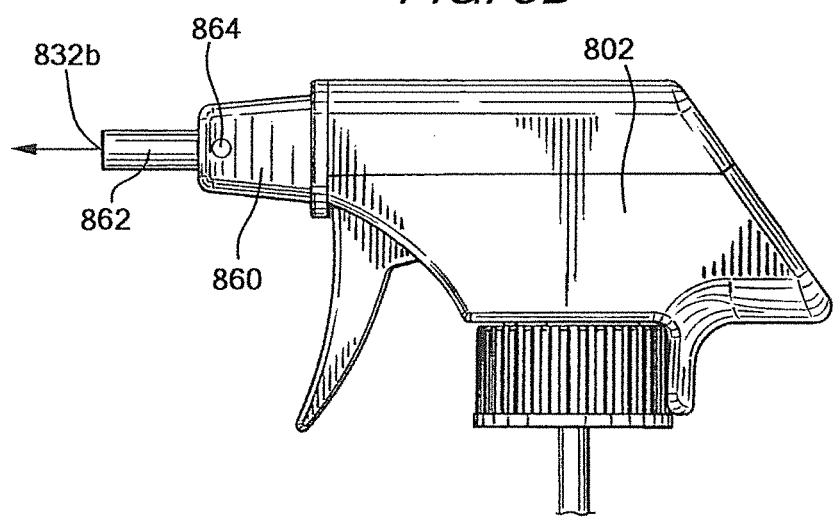
FIG. 8B depicts a side perspective view of the example dispenser of FIG. 8A in a second position.
Figure 8C:
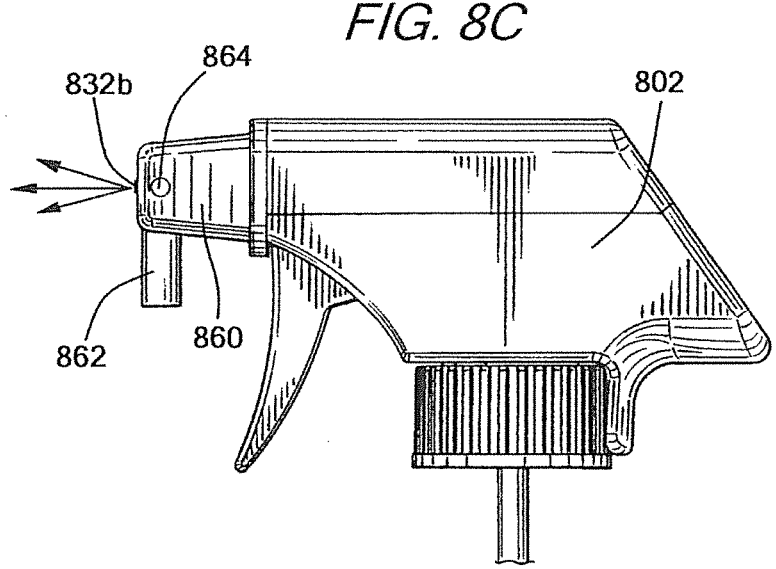
FIG. 8C depicts a side perspective view of the example dispenser of FIG. 8A in the first position.

FIGS. 8A-8C depict an example of a flip-type nozzle assembly 810. The example depicted in FIGS. 8A-8C is also similar to the examples of FIGS. 1A-J, 2A-2B and can include the same internal working components with the same functionality as the example described in relation to FIGS. 1A-J, 2A-2B. Like reference numerals represent like components and the example shroud 802 and nozzle assembly 810 can be used in conjunction with a similar trigger engine as the example shown and described above in relation to FIGS. 1A-1J.

The example of FIG. 8A-8C does not include a nozzle slide. Instead, the nozzle assembly 810 includes a nozzle extension 862, which is configured to rotate on a pivot 864 on the nozzle 860. The nozzle extension 862 can be a tube and can be provided with two flow channels for different dispensing modes. The rotation of the nozzle extension 862 provides the different dispensing modes for the nozzle assembly 810. FIGS. 8A and 8C depict the nozzle assembly in the spray mode, and FIG. 8B depicts the nozzle assembly in the stream mode. Also as shown in FIGS. 8A-8C, this example can include two exit orifices 832a and 832b.

The nozzle assembly 810 operates in a similar fashion as the nozzle slide embodiments by providing an increased length passageway between the Slit valve (not shown) and the exit orifices 832a and 832b. The nozzle extension 862 can include a first internal passageway that extends in a radial direction in the tube and a second internal passageway that extends in an axial direction along the tube. The first passageway is connected to the first exit orifice 832a and the second passageway is connected to the second exit orifice 832b.

When the nozzle extension 862 is in the down position as in FIGS. 8A and 8C, the fluid will travel a shorter distance through the first internal passageway between the exit orifice 832a and the internal slit valve to provide a spray mode. The exit orifice 832a can also be configured to dispense a spray from the nozzle 860. When the nozzle extension 862 is in the up position as shown in FIG. 8B, the fluid will travel through the second passageway, a longer distance between the exit orifice 832b and the internal slit valve, to provide a stream mode or bead-like application of chemistry when the trigger is pulled:

In one example, when the nozzle extension 862 is in the raised position, the exit orifice 832a and the first passageway is blocked by a wall formed by the nozzle 860 such that no fluid is dispensed from the exit orifice 832a when the nozzle is in stream mode. Additionally, the first passageway can provide a seal on the nozzle 860 to prevent fluid from traveling out of the nozzle 860 through the second passageway. The nozzle extension 862 when in the up or the extended position provides extra reach for the user. For example, the user can reach into tight edges or corners, and apply chemistry to a specific location.

FIGS. 9A-9I depict another example of a fluid dispenser 900 configured to draw up fluid from a container and to provide various dispensing modes. FIGS. 9A-9C illustrate the components that form the fluid dispenser 900. In particular, FIG. 9A shows an isometric view of a partial assembly of the example fluid dispenser 900 with the sliding nozzle 912 in a first closed position, and FIG. 9B shows an isometric view of a partial assembly of the example fluid dispenser 900 with the sliding nozzle 912 in a second opened position. FIG. 9C shows an isometric, exploded view of the fluid dispenser 900.

In this example, the fluid dispenser 900 nozzle assembly 910 can include a first nozzle or rotary nozzle 960, and a second nozzle or sliding nozzle 912, both of which are configured to dispense product in different dispensing modes. In this example, the rotary nozzle 960 can be configured to provide "SPRAY," "OFF," and "STREAM" modes, and the sliding nozzle 912 can be configured to dispense a bead-like stream of product from the fluid dispenser 900.

The nozzle assembly may include a nozzle adapter 918 that can be configured to fit onto a trigger engine 20 to modify the dispensing characteristics of the trigger engine. The nozzle adapter 918 can provide an interface between the first rotary nozzle 960, the second sliding nozzle 912 and the trigger engine 20 to deliver fluid from the trigger engine 20 to both the rotary nozzle 960 and the sliding nozzle 912. The nozzle adapter 918 can also be configured to receive a slit valve 916, which can help provide the desired dispensing characteristics of the rotary nozzle 960.

As shown in relation to FIGS. 9A-9C, like the example described in relation to FIGS. 1A-1J above, the fluid dispenser 900 can also include a trigger engine 20, and a shroud 902, which acts as a covering for the nozzle assembly. 910 and the trigger engine 20 of the fluid dispenser 900. The fluid dispenser 900 can also include an internally threaded cylindrical portion 30 for securing the fluid dispenser 900 to a container or bottle (not shown). The trigger engine 20 can also include trigger lever 22, a pumping mechanism formed of a cylinder 24 that receives a piston and spring assembly (not shown), a dispensing tube 26, an internal check valve (not shown), and an internal passageway 28. The trigger engine 20 can also include a cylindrical dip tube 40 which extends into an opening of the container or bottle and into the fluid for drawing the fluid up from the container and into the trigger engine 20 and into the nozzle assembly 910.

The rotary nozzle 960 can include a first orifice 932a for dispensing the fluid from the trigger engine 20 and can be configured to be manually adjusted by the user to provide either "SPRAY," "OFF," or "STREAM" modes. In one example, the rotary nozzle 960 can fit onto the nozzle adapter 918 using a barb-type connection. In particular, as shown in FIG. 9D, the rotary nozzle 960 can include a recess 949 for receiving a corresponding barb 931 on an external spout 929 of the nozzle adapter 918. However, other types of mechanical connections are contemplated, e.g., interference fit, threads, bayonet, ball and socket, etc., to connect the rotary nozzle 960 to the nozzle adapter 918.

In one example, the rotary nozzle 960 can be provided with one or more shoulders 961 around the periphery of the rotary nozzle 960 that correspond with the various spray positions. In one example, a shoulder 961a can be raised slightly so that the sliding nozzle 912 will be prevented from sliding outward into the opened position by the one or more raised shoulders if the user attempts to extend the sliding nozzle 912 while the rotary nozzle 960 is in either a "STREAM" or "SPRAY" position, for example. Thus, in this example, to activate the sliding nozzle 912, a user would first have to rotate the rotary nozzle 960 to the "OFF" or closed position before being able to extend the sliding nozzle 912 forward into the open position.

The rotary nozzle 960 can have four sides and each side can have words, abbreviations, symbols, or other indicia placed on it, such as "SPRAY," "STREAM," or "OFF." In one example, the rotary nozzle 960 can be pivotally attached to the nozzle adapter 918 and allows for a user to select between the different modes. The rotary nozzle 960 itself can be configured or components can be added to provide suitable dispensing characteristics and can include spray, stream, adjustable nozzles which provide for a stream of the substance to be dispensed, e.g., a nozzle with straight channels inside the nozzle to produce a high velocity narrow stream. For spray or mist characteristics, the rotary nozzle 960 may be adapted by having, for example, suitable grooves in a spiral to impart spin and turbulence. The rotary nozzle 960 can be configured to produce a plume or cloud of the product to be dispensed in fine, medium and coarse characteristics. In another example, the rotary nozzle 960 may comprise an "infinity" spray-to-stream adjustable nozzle. This type of adjustable nozzle can be a screw-type nozzle with a full range of stream and spray patterns. Although not shown, the rotary nozzle 960 can include a snap fit, removable cap to allow rinsing or cleaning of the cap and/or the rotary nozzle 960.

It is also contemplated that the rotary nozzle 960 may be available in a spray only configuration, or it could be available in a foaming nozzle arrangement, wherein air intakes allow air to be introduced into the stream of material passing through the nozzle 960 either in a stream or spray pattern. This air introduction creates turbulence to mix air and the fluid to be dispensed for foaming action.

The sliding nozzle 912 is configured to slide from a closed position shown in FIGS. 9A and 9D to an open position as shown in FIGS. 9B and 9E to provide bead-like stream of product from the fluid dispenser 900. As shown in FIGS. 9B and 9C, the sliding nozzle 912 can be placed on the trigger engine 20 and can be configured to slide within the shroud 902 along the trigger engine 20 and on the top of the nozzle adapter 918.

The sliding nozzle 912 can be configured to both dispense and block fluid in the second passageway 923b of the nozzle adapter 918. As shown in FIG. 9D, the sliding nozzle 912 is configured to block flow from the conical valve 933 when the sliding nozzle 912 is in the closed position, and as shown in FIG. 9E, the sliding nozzle 912 is configured to selectively receive product flow from the second passageway 923b into a sliding nozzle passageway 947 when the sliding nozzle 912 is in the opened position.

As shown in FIGS. 9E and 9H, the nozzle passageway 947 extends from a bottom portion of the sliding nozzle 912 and forms a 90 degree bend to provide fluid communication from a bottom portion inlet 921 of the sliding nozzle passageway 947, through the body of the sliding nozzle 912. The sliding nozzle passageway 947 also routes fluid to a second orifice 932b in the sliding nozzle 912, which in one example can be configured to dispense the fluid in a bead-like stream of product.

Also as shown in FIG. 9H, The sliding nozzle 912 can be provided with a round projection 943 that is configured to align with the enlarged diameter portion 945 located on the nozzle adapter 918. The sliding nozzle 912 projection 943 can be formed larger than the enlarged diameter portion 945 such that when the projection 943 is aligned with the enlarged diameter portion 945 of the nozzle adapter 918, the sliding nozzle 912 locks into the nozzle adapter 918 via a friction-fit type connection. The projection 943 and the enlarged diameter portion 945 of the nozzle adapter 918 together limit the movement of the sliding nozzle 912 on the fluid dispenser 900 and provide the user with a tactile response such that the user can feel when the sliding nozzle 912 is in the dispensing mode. It is contemplated that the projection 945 can take on other forms and shapes to limit the movement of the sliding nozzle 912 in the open position. It is also contemplated that the nozzle adapter 918 can be configured to secure the sliding nozzle 912 in the closed position.

As shown in FIGS. 9F-9I, the sliding nozzle 912 can be provided with rails 953 which can be located in corresponding channels 955 in the nozzle adapter 918. The rails 953 and corresponding channels 955 can be oriented parallel to the sliding movement of the sliding nozzle 912. The rails 953 and corresponding channels 955 limit the movement of the sliding nozzle 912 on the fluid dispenser and ensure that the sliding nozzle 912 can only move along the top of the fluid dispenser 900 and prevent the sliding nozzle 912 from being inadvertently detached from the fluid dispenser 900. The rails 953 and corresponding channels 955 may also provide a smooth operation of the sliding nozzle from the closed position to the open position.

Other methods of limiting the sliding nozzle 912 in fluid dispenser 900 are contemplated. For example, forming the ends of the sliding nozzle 912 larger than the guide 927 of the nozzle adapter 918 can limit the movement of the sliding nozzle 912 in the open or closed positions. Alternatively or in addition, the fluid dispenser 900 can also be provided with a recess to receive the projection 943 of the sliding nozzle 912 to secure the sliding nozzle 912 in the closed position. Alternatively or in addition, the shroud 902 can be configured to frictionally engage the sliding nozzle 912 to lock the sliding nozzle 912 into place in the open or closed position.

As shown in FIG. 9I, the sliding nozzle 912 can include one or more gripping elements 941 on the rear portion of the sliding nozzle 912 to assist the user to grasp and slide the sliding nozzle 912 to the operating position and back to the closed position. It is also contemplated that the gripping elements 941 can be provided along other portions and/or along the entire length of the sliding nozzle 912.

The nozzle adapter 918 acts as a common interface between the trigger engine 20, the sliding nozzle 912, and the rotary nozzle 960. In particular, the nozzle adapter 918 has one side sized to receive an outlet of the dispensing tube 26 of the trigger engine 20, a second side sized to receive the rotary nozzle 960, and a third side configured to be in fluid communication with the passageway 947 on the sliding nozzle 912 when the slide is moved to an extended position. The nozzle adapter 918 can be placed in fluid communication with the dispensing tube 26 and can be configured to deliver fluid to either the sliding nozzle 912 or the rotary nozzle 960 such that the sliding nozzle 912 and the rotary nozzle 960 can modify the dispensing modes of the trigger engine 20. The nozzle adapter 918 also helps guide the sliding nozzle 912 as the sliding nozzle 912 is moved from an open position to a closed position and receives the rotary nozzle 960 and the slit valve 916.

As shown in FIGS. 9D and 9E, the nozzle adapter 918 can be provided with a passageway 923 which can diverge into a first passageway 923a and a second passageway 923b within the nozzle adapter 918. The first passageway 923a can be provided to selectively deliver fluid to the rotary nozzle 960, and the second passageway 923b can be provided to selectively deliver fluid to the sliding nozzle 912.

In addition, a conical valve 933 can be placed within an enlarged diameter portion or recess 945 in the second passageway 923b to direct fluid flow toward the sliding nozzle 912. The conical valve 933 prevents air from traveling back into the system after the trigger lever 22 has been actuated and released. The conical valve 933 can be a one-way flap valve that allows the liquid to pass through it, but prevents air or liquid from passing back into the trigger engine 20. The conical valve 933 can take on alternate configurations to route the fluid into the sliding nozzle 912 and can also be formed integral with the sliding nozzle 912 or the nozzle adapter 918.

As shown in FIGS. 9C-9E, a gasket in the form of an o-ring 925 can be placed between the nozzle adapter 918 and the sliding nozzle 912 to provide a seal between the second passageway 923b in the nozzle adapter 918 and the sliding nozzle passageway 947 in the sliding nozzle 912 to reduce leakage in the fluid dispenser 900. The o-ring 925 can also be placed in the enlarged diameter portion 945 in the second passageway 923b of the nozzle adapter 918 and onto the conical valve 933. The o-ring 925, thus, provides a seal between the conical valve 933 and the sliding nozzle 912.

Also while the o-ring 925 and the conical valve 933 are shown as two separate components, it is contemplated that the O-ring 925 and conical valve 933 can be integrally formed as a single component. It is also contemplated that a gasket could be formed integral with either the sliding nozzle 912 or the nozzle adapter 918 to provide an adequate seal between the sliding nozzle 912 and the nozzle adapter 918.

As shown in FIG. 9F, the nozzle adapter 918 is provided with a guide 927 and channels 955 that are configured to receive the sliding nozzle 912 and corresponding rails 953 therein and provide a track for the sliding nozzle 912 when the sliding nozzle 912 is moved from the closed position to the open position. Also the enlarged diameter portion or recess 945 of the nozzle adapter 918 can be provided for accommodating the corresponding projection 943 on the sliding nozzle 912. As shown in FIG. 9F, the enlarged diameter portion 945 can open into the second passageway 923b and can extend through the guide 927 formed in the top of the nozzle adapter 918.

Also as shown in FIG. 9F, the nozzle adapter 918 is also provided with an external spout 929. The outer cylindrical surface of the spout 929 of the adapter 918 can be provided with a barb 931, which can extend circumferentially around a middle region of the external spout 929 and can be used to secure the rotary nozzle 960 in place on the nozzle adapter 918. In particular, the rotary nozzle 960 corresponding barb recess 949 can receive the barb 931 of the external spout 929 to secure the rotary nozzle 960 to the nozzle adapter 918. An inner cylindrical surface defining the first passageway 923a located in the external spout 929 can be configured to receive and hold the slit valve 916 therein.

As shown in FIG. 9G, the nozzle adapter 918 can also be provided with cutout portion 935 for accommodating the dispensing tube 26 of the trigger engine 20. The nozzle adapter 918 can also be provided with an internal spout 937 located in the cutout portion 935 of the nozzle adapter that provides for fluid communication with the dispensing tube 26 and defines the nozzle adapter 918 passageway 923. The internal spout 937 can either fit within the dispensing tube 26 or over an outer cylindrical surface of the dispensing tube 26. As shown in FIG. 9G, the internal spout 937 bore may also include a square keyway 939 for aligning the nozzle adapter 918 on the dispensing tube 26 to ensure that the nozzle adapter 918 is in the proper location during assembly. The keyway 939 also can prevent the nozzle adapter 918 from rotating relative to the dispensing tube 26 and the trigger engine 20 during use. Additionally, as shown in FIG. 9C, the dispensing tube 26 can also be provided with a barb 951 to provide a frictional-type fit between the dispensing tube 29 and the internal spout 937 of the nozzle adapter 918. Additionally, although not required, the nozzle adapter can also in one example include a corresponding recess to receive the barb 951. Other mechanical connections between dispensing tube 29 and the nozzle adapter 918 are also contemplated, e.g., interference fit, threads, bayonet, ball and socket, etc.

A slit valve 916 can be placed in the nozzle adapter 918 and within the rotary nozzle 960 to provide the desired spray characteristics of the fluid dispenser 900. For example, the slit valve 916 can stay in a fixed relation to the nozzle adapter 918 and can form a seal within the nozzle adapter 918. Like the slit valve 116 discussed above, the slit valve 916 can also include a radially extending flange that seals against an interior chamber formed in the nozzle adapter 918. The slit valve 916 can provide a one-way valve for fluid flow and may provide multiple slit valve spray channels depending on the desired spray characteristics. It is also contemplated that the slit valve 916 could be formed integral with the nozzle adapter 918 or rotary nozzle 960 to provide the desired dispensing characteristics.

The trigger engine 20 can operate in a similar fashion as discussed above in relation to the example shown in FIGS. 1A-1J above and dispenses fluid by actuating the trigger lever 22 when either the rotary nozzle 960 or the sliding nozzle 912 are in opened positions. The user can manipulate the rotary nozzle 960 and the sliding nozzle 912 into a plurality, of dispensing modes and an off mode.

FIG. 9D shows a cross-sectional view of the fluid dispenser nozzle assembly 910 with the rotary nozzle 960 in the opened position and the sliding nozzle 912 in the closed position and illustrates the fluid flow A through the fluid dispenser 900 and the rotary nozzle 960 and illustrates the "SPRAY" and "STREAM" modes. The user can rotate the rotary nozzle 960 to select the modes of the fluid dispenser 900. In one example, to select a stream-type application (i.e., the fluid flow from the nozzle 960 is a strong, generally coherent stream), the nozzle 960 is pivoted until a side of the nozzle 960 with the word or indicia "STREAM" is facing upwards. Similarly, to select a spray-type application (i.e., the fluid flow from the nozzle 960 is a generally fine mist), the nozzle 960 is pivoted until a side of the nozzle 960 with the word or indicia "SPRAY" is facing upwards. In examples including an "off" setting, when the nozzle 960 is pivoted until a side of the nozzle 960 with the word or indicia "OFF" is facing upwards, the nozzle 960 will be shut off and no flow will be able to emit from the nozzle 960.

When the dispensing modes of the rotary nozzle 960 are selected, the rotary nozzle 960 can be configured to prevent the sliding nozzle 912 from moving into the opened position. This prevents fluid from being dispensed out of the sliding nozzle 912 when the rotary nozzle 960 is in a dispensing mode. Thus, product can only be dispensed from the sliding nozzle 912 when the rotary nozzle 960 is in the off position.

As shown in FIG. 9D, when the sliding nozzle 912 is in the retracted or closed position, the fluid dispenser 900 can only dispense product from the rotary nozzle 960. This is achieved by blocking the second passageway 923b in the nozzle adapter 918 with an underside surface of the sliding nozzle 912 when the sliding nozzle 912 is located in the closed position. As shown in FIG. 9D, when the second passageway 923b is blocked by the sliding nozzle 912, all the fluid is pumped through the first passageway 923a in the nozzle adapter 918, the slit valve 916 and to the first orifice 932a in the rotary nozzle 960.

FIG. 9E shows a cross-sectional view of the fluid dispenser nozzle assembly 910 with the sliding nozzle 912 in the opened position and illustrates the fluid flow B through the fluid dispenser 900 and the sliding nozzle 912 to provide a bead-like stream of product. When the user places the sliding nozzle 912 into the open extended position, the fluid dispenser 900 will dispense product from the second, orifice 932b of the sliding nozzle 912. Fluid flow from the sliding nozzle 912 is achieved by the second passageway 932b in the nozzle adapter 918 being in line with the internal passageway 947 in the underside of sliding nozzle 912.

As shown in relation to FIG. 9E, fluid restriction in the sliding nozzle 912 passageway 947 can be less than the typical fluid path in the rotary nozzle 960 (even with the rotary nozzle 960 being left in a dispensing position); therefore, the fluid only travels through the sliding nozzle 912. Like in the above nozzle slide examples, when the sliding nozzle is in the open extended position, the extension of the nozzle may allow a user to better reach into tight crevasses (e.g., corners). However, in this example the sliding nozzle 912 may achieve additional linear extension to achieve an extended reach for the user into these areas.

It may be desired in certain instances to prevent the fluid from traveling through the rotary nozzle 960 when the sliding nozzle 912 is in an opened position. In one example, as discussed above, the rotary nozzle 960 must be in the "off" setting before the user can slide the sliding nozzle 912 to the open position. Rotating the rotary nozzle 960 to the closed or off position will ensure that all of the fluid will be directed into the sliding nozzle 912, and may avoid any leakage that may otherwise occur through the rotary nozzle 960 if the rotary nozzle 960 is left in the dispensing positions, e.g. "SPRAY" or "STREAM." Therefore, in this example, the fluid dispenser 900 is configured to only dispense fluid from the sliding nozzle 912 while the sliding nozzle 912 is in the extended or open position.

When the rotary nozzle 960 is moved into the closed or off position and the sliding nozzle 912 is located in the closed position, fluid cannot be dispensed from the trigger engine 20. When the sliding nozzle 912 is in the retracted position and the rotary nozzle 960 is in the "Off" position, the fluid dispenser 900 is ready for shipping and storage.

The nozzle assembly examples above are not limited to the specific spray patterns discussed herein and any desired spray pattern can be achieved depending on the configuration of the spray channels, slit valve, and nozzle. Additionally, any of the examples discussed herein could be adapted to accommodate attachments, working ends or tools for specific purposes, e.g., scrubbing, polishing, disinfecting, etc.

II. Features of Fluid Dispensers and Methods of Operation and Assembly of Fluid Dispensers According to Examples of the Disclosure In one example, a fluid delivery system for dispensing fluid can include a dispenser configured to draw fluid up from a container. A shroud can be configured to mount to the dispenser, and a nozzle assembly can include a nozzle, and a nozzle slide. The nozzle slide can be configured to slide relative to the shroud to provide different dispensing modes. The nozzle slide can be configured to rotate relative to the shroud into an off position.

The fluid delivery system can also include a slit valve, and when the nozzle slide slides relative to the shroud, the nozzle can move relative to the slit valve. The nozzle slide can be configured to move to a first position relative to the shroud to provide a spray pattern and a second position relative to the shroud to provide a stream pattern. In the first position the nozzle is located at a first distance away from the slit valve, and in the second position the nozzle is located at a second distance away from the slit valve. The second distance can be greater than the first distance.

The nozzle can define a first plane in the first position, and the first plane may not extend past a plane defined by a front wall of a spray bottle. The nozzle defines a second plane in the second position, and the second plane can extend past a plane defined by a front wall of a spray bottle.

The fluid delivery system may also include a nozzle insert, and the nozzle insert can be placed into the nozzle slide. The nozzle insert can include one or more nozzle insert spray channels, and the slit valve can include one or more slit valve spray channels. The slit valve spray channels and the nozzle insert spray channels are placed into and out of alignment when the nozzle slide is rotated relative to the shroud.

In another example, a fluid delivery system for dispensing fluid can include a dispenser configured to draw fluid up from a container, a shroud configured to mount to the trigger engine, and a nozzle assembly comprising a nozzle. The nozzle can be configured to rotate in less than 90 degree increments relative to the shroud to provide different dispensing modes. In particular, the nozzle can be configured to rotate in 30 degree increments relative to the shroud to provide the different dispensing modes.

In another example, a fluid delivery system for dispensing fluid can include a dispenser configured to draw fluid up from a container, a shroud configured to mount to the trigger engine, and a nozzle assembly. The nozzle assembly can include a nozzle and a nozzle extension. The nozzle extension can be configured to rotate relative to the shroud to provide different spray patterns out of the nozzle. The extension can include a tube, and the extension can have a first orifice and a second orifice. The tube can include a first passageway and a second passageway. The first passageway can extend radially through the tube and the second passageway can extend axially through the tube. The first passageway can be connected to the first orifice and the second passageway can be connected to the second orifice.

In another example, a method of assembling a dispensing fluid can include: configuring a dispenser to draw fluid up from a container, mounting a shroud to the dispenser, providing a nozzle assembly comprising a nozzle and a nozzle slide, and configuring the nozzle slide to slide relative to the shroud to provide different dispensing modes.

The method may also include configuring the nozzle slide to rotate relative to the shroud into an off position, providing a slit valve and configuring the nozzle slide to slide relative to the shroud and configuring the nozzle to move relative to the slit valve. The method may also include configuring the nozzle slide to move to a first position relative to the shroud to provide a spray pattern and a second position relative to the shroud to provide a stream pattern. The method can also include configuring the nozzle in the first position to be located at a first distance away from the slit valve and configuring the nozzle in the second position to be located at a second distance away from the slit valve. The second distance can be greater than the first distance.

The method can further include configuring the nozzle such that the nozzle defines a first plane in the first position. The first plane may not extend past a plane defined by a front wall of a spray bottle. The method may also include configuring the nozzle to define a second plane in the second position. The second plane may extend past a plane defined by a front wall of a spray bottle. The method may also include providing a nozzle insert and placing the nozzle insert into the nozzle slide. The method may also include providing the nozzle insert with one or more nozzle insert spray channels and providing the slit valve with one or more slit valve spray channels and configuring the slit valve spray channels and the nozzle insert spray channels to be placed into and out of alignment when the nozzle slide is rotated relative to the shroud.

In another example, a method for dispensing fluid may include providing a dispenser configured to draw fluid up from a container, configuring a shroud to mount to the dispenser, providing a nozzle assembly with a nozzle, and configuring the nozzle to rotate in less than 90 degree increments relative to the shroud to provide different dispensing modes. Specifically, the method can include configuring the nozzle to rotate in 30 degree increments relative to the shroud to provide the different dispensing modes.

In another example, a method for dispensing fluid can include: configuring a dispenser to draw fluid up from a container, configuring a shroud to mount to the dispenser, providing a nozzle assembly having a nozzle and a nozzle extension, and configuring the nozzle extension to rotate relative to the shroud to provide different spray patterns out of the nozzle. The extension can be a tube, and the extension can have a first orifice and a second orifice. The method can further include providing the tube with a first passageway and a second passageway and the first passageway can extend radially through the tube and the second passageway can extend axially through the tube. The method may also include connecting the first passageway to the first orifice and connecting the second passageway to the second orifice.

In another example, a fluid delivery system for dispensing fluid can include a dispenser configured to draw fluid up from a container, a shroud configured to mount to the dispenser, and a nozzle assembly having a first nozzle and a second nozzle. The first nozzle may be configured to provide a first dispensing mode, and the second nozzle can be configured to provide a second dispensing mode different from the first dispensing mode. The first nozzle can be configured to provide a third dispensing mode and an off mode, and the first nozzle can be configured to rotate between the first dispensing mode, the third dispensing mode, and an off position. The second nozzle can be configured to slide from a closed position to an open position to provide the second dispensing mode. The first nozzle can provide at least one stop for the second nozzle to prevent the second nozzle from being positioned into the open position when the first nozzle is in a dispensing mode.

A nozzle adapter can also be provided on the fluid dispenser for receiving the first nozzle and the second nozzle. The nozzle adapter can include a first passageway for directing fluid to the first nozzle and a second passageway for directing fluid to the second nozzle. The nozzle adapter can also include a recess for receiving a corresponding projection on the second nozzle to secure the second nozzle in the operating position and may include a guide for permitting the second nozzle to slide from the closed position to the open position. The recess of the nozzle adapter can be configured to receive a valve for directing fluid to a second nozzle passageway in the second nozzle when the second nozzle is in the open position. The second nozzle is configured to block flow from the valve when the second nozzle is in the closed position.

The recess of the nozzle adapter can be configured to receive a gasket to provide a seal between the second passageway in the nozzle adapter and the second nozzle passageway. The nozzle adapter can further include a first spout having a barb for securing the first nozzle to the nozzle adapter. The nozzle adapter may also include a second spout being formed within a cutout portion of the nozzle adapter and can be configured to receive a dispensing tube. The second spout may include a keyway for receiving the dispensing tube and for preventing rotation of the nozzle adapter relative to the dispensing tube.

In another example, a method can include providing a first nozzle and a second nozzle on a fluid dispenser, configuring the first nozzle to rotate to provide a first dispensing mode from the fluid dispenser, and configuring the second nozzle to slide to provide a second dispensing mode different from the first dispensing mode from the fluid dispenser.

The method may also include providing a nozzle adapter configured to selectively provide fluid to the first nozzle and the second nozzle and providing a first passageway and a second passageway in the nozzle adapter and configuring the first passageway to provide fluid to the first nozzle. The second passageway can be configured to provide fluid to the second nozzle. The adapter can be provided with a recess for receiving a corresponding projection on the second nozzle for locking the second nozzle in the second dispensing mode. The recess can be provided with a valve for directing fluid to a second nozzle passageway in the second nozzle. The second nozzle can be configured to block the second passageway of the nozzle adapter when the second nozzle is in a closed position. The adapter can be configured to guide the second nozzle from a closed position to an open position.

The method may also include providing a stop on the first nozzle that prevents the second nozzle from sliding to an open position when the first nozzle is in a dispensing mode. The first nozzle can be provided with a third dispensing mode different from the first dispensing mode and the second dispensing mode, and the first nozzle can be provided with an off mode.

An example trigger sprayer may include a housing having an inlet portion and an outlet portion, a pumping mechanism including a trigger lever associated with the housing, a coupling provided at the inlet portion and configured to secure the housing to a container having a front wall defining a vertical plane, and a first nozzle provided at the outlet portion. The first nozzle can be configured to be selectively moveable by a user between a first position in which the first nozzle does not extend beyond the vertical plane defined by the front wall of the container and a second position in which at least a portion of the first nozzle extends beyond the vertical plane defined by the front wall of the container. The first nozzle can provide a first dispensing mode in the first position and a second dispensing mode in the second position that is different than the first dispensing mode. The first dispensing mode can provide a spray pattern and the second dispensing mode can provide a stream pattern. The first nozzle can include a tip portion and a slide portion, the slide portion can be configured to move outward in a substantially linear manner relative the housing for moving the tip portion beyond the vertical plane defined by the front wall of the container. The nozzle can be mounted to a nozzle slide, and the nozzle slide can be configured to rotate relative to the housing into an off position. The nozzle slide rotates approximately 30 degrees relative to the housing to achieve the off position.

The example trigger sprayer can include a second nozzle provided at the outlet portion of the housing, and the first nozzle can provide a first dispensing mode and the second nozzle can provide a second dispensing mode that is different than the first dispensing mode. The second nozzle can be configured to provide a third dispensing mode and an off mode, and the second nozzle can be configured to rotate between the second dispensing mode, the third dispensing mode, and an off position.

The first nozzle can be configured to slide from a closed position to an open position to provide the first dispensing mode, and the second nozzle can provide at least one stop for the first nozzle to prevent the first nozzle from being positioned into the open position when the second nozzle is in a dispensing mode. A nozzle adapter for receiving the first nozzle and the second nozzle may also be provided on the trigger sprayer. The nozzle adapter can include a first passageway for directing fluid to the first nozzle and a second passageway for directing fluid to the second nozzle. The nozzle adapter can further include a recess for receiving a corresponding projection on the first nozzle to secure the first nozzle in an operating position and a guide for permitting the first nozzle to slide from a closed position to an open position.

The recess of the nozzle adapter can be configured to receive a valve for directing fluid to a first nozzle passageway in the first nozzle when the first nozzle is in the open position, and the first nozzle can be configured to block flow from the valve when the first nozzle is in the closed position. The recess of the nozzle adapter can be configured to receive a gasket to provide a seal between the first passageway in the nozzle adapter and the first nozzle passageway. The nozzle adapter further may also include a first spout having a barb for securing the second nozzle to the nozzle adapter, and the nozzle adapter can include a second spout being formed within a cutout portion of the nozzle adapter and can be configured to receive a dispensing tube. The second spout can include a keyway for receiving the dispensing tube can help to prevent rotation of the nozzle adapter relative to the dispensing tube.

In another example, a fluid delivery system for dispensing fluid can include a dispenser configured to draw fluid up from a container and a nozzle assembly which includes a nozzle and a means for effectively extending the nozzle length to provide at least one dispensing mode. The example fluid delivery system can include a slit valve and when the nozzle extends, the nozzle can move relative to the slit valve. The nozzle slide can be configured to move to a first position to provide a spray pattern and a second position to provide a stream pattern. In the first position the nozzle can be located at a first distance away from the slit valve and in the second position the nozzle can be located at a second distance away from the slit valve and the second distance can be greater than the first distance.

In another example, a method of assembling a dispensing fluid may include configuring a dispenser to draw fluid up from a container, providing a nozzle for dispensing the fluid, and configuring the nozzle to slide to provide different dispensing modes. The method may also include configuring the nozzle to move to a first position to provide a spray pattern and a second position to provide a stream pattern, configuring the nozzle such that the nozzle defines a first plane in the first position, and configuring the nozzle such that the first plane does not extend past a plane defined by a front wall of a spray bottle. The method can also include configuring the nozzle to define a second plane in the second position and configuring the nozzle such that the second plane extends past a plane defined by a front wall of a spray bottle.

An exemplary method of assembling a fluid delivery can include filling a container with a fluid, the container having a front wall defining a vertical plane, coupling a trigger sprayer to the container. The trigger sprayer may include a housing having an inlet portion and an outlet portion, a pumping mechanism including a trigger lever associated with the housing. A coupling can be provided at the inlet portion and can be configured to secure the housing to a container having a front wall defining a vertical plane. A first nozzle can be provided at the outlet portion and can be configured to be selectively moveable by a user between a first position in which the first nozzle does not extend beyond the vertical plane defined by the front wall of the container and a second position in which at least a portion of the first nozzle extends beyond the vertical plane defined by the front wall of the container. The method can also include applying a shrink sleeve label to the container by passing the shrink sleeve label over the trigger sprayer while the first nozzle is in the first position.

The present invention is disclosed above and in the accompanying drawings with reference to a variety of examples. The purpose served by the disclosure, however, is to provide examples of the various features and concepts related to the invention, not to limit the scope of the invention. One skilled in the relevant art will recognize that numerous variations and modifications may be made to the examples described above without departing from the scope of the present invention.

INDUSTRIAL APPLICABILITY

The disclosure herein provides fluid delivery systems and methods for dispensing fluids. The example fluid delivery systems and methods may, in certain examples, be used to provide various fluid dispensing modes.

The invention claimed is:

1. A trigger sprayer comprising:
a housing having an inlet portion and an outlet portion;
a pumping mechanism including a trigger lever associated with the housing;
a coupling provided at the inlet portion and configured to secure the housing to a container having a front wall defining a vertical plane; and
a first nozzle provided at the outlet portion and configured to be selectively moveable by a user between a first position in which the first nozzle does not extend beyond the vertical plane defined by the front wall of the container and a second position in which at least a portion of the first nozzle extends beyond the vertical plane defined by the front wall of the container and a second nozzle provided at the outlet portion of the housing, wherein the first nozzle provides a first dispensing mode and the second nozzle provides a second dispensing mode that is different than the first dispensing mode.

2. The trigger sprayer of claim 1 wherein the second nozzle provides a third dispensing mode that is different than the second dispensing mode.

3. The trigger sprayer of claim 2 wherein the second dispensing mode provides a spray pattern and the third dispensing mode provides a stream pattern.

4. The trigger sprayer of claim 2 wherein the first nozzle comprises a tip portion and a slide portion, the slide portion being configured to move outward in a substantially linear manner relative the housing for moving the tip portion beyond the vertical plane defined by the front wall of the container.

5. The trigger sprayer of claim 2 wherein the second nozzle must be in the off position before the first nozzle can be moved into the second position.

6. The trigger sprayer of claim 1 wherein the second nozzle is configured to provide a third dispensing mode and an off mode and wherein the second nozzle is configured to rotate between the second dispensing mode, the third dispensing mode, and an off position.

7. The trigger sprayer of claim 6 wherein the first nozzle is configured to slide from a closed position to an open position to provide the first dispensing mode.

8. The trigger sprayer of claim 6 wherein the second nozzle provides at least one stop for the first nozzle to prevent the first nozzle from being positioned into the second position when the second nozzle is in a dispensing mode.

9. The trigger sprayer of claim 6 further comprising a nozzle adapter for receiving the first nozzle and the second nozzle, the nozzle adapter comprising a first passageway for directing fluid to the first nozzle and a second passageway for directing fluid to the second nozzle.

10. The trigger sprayer of claim 9 wherein the nozzle adapter further comprises a recess for receiving a corresponding projection on the first nozzle to secure the first nozzle in an operating position and a guide for permitting the first nozzle to slide from a closed position to an open position.

11. The trigger sprayer of claim 10 wherein the recess of the nozzle adapter is configured to receive a valve for directing fluid to a first nozzle passageway in the first nozzle when the first nozzle is in the open position and wherein the first nozzle is configured to block flow from the valve when the first nozzle is in the closed position.

12. The trigger sprayer of claim 11 wherein the recess of the nozzle adapter is configured to receive a gasket to provide a seal between the first passageway in the nozzle adapter and the first nozzle passageway.

13. The trigger sprayer of claim 9 wherein the nozzle adapter further comprises a first spout having a barb for securing the second nozzle to the nozzle adapter.

14. The trigger sprayer of claim 13 wherein the nozzle adapter further comprises a second spout being formed within a cutout portion of the nozzle adapter and being configured to receive a dispensing tube.

15. The trigger sprayer of claim 14 wherein the second spout comprises a keyway for receiving the dispensing tube and for preventing rotation of the nozzle adapter relative to the dispensing tube.

16. The trigger sprayer of claim 1 wherein the first nozzle moves relative to the housing when moving between the first position and the second position.

17. The trigger sprayer of claim 1 wherein the first nozzle moves in a substantially linear manner when moving between the first position and the second position.

18. The trigger sprayer of claim 1 wherein a tactile response is provided to the user when the first nozzle is moved into the second position.

19. The trigger sprayer of claim 1 wherein the first nozzle includes a gripping element configured to be engaged by the user to move the first nozzle between the first position and the second position.

* * * * *